United States Patent [19]

Asano et al.

[11] Patent Number: 4,997,874

[45] Date of Patent: Mar. 5, 1991

[54] AQUEOUS SUSPENSION AND PREPARATION METHOD THEREOF

[75] Inventors: Makoto Asano; Kiyoharu Hasegawa, both of Yokohama; Masatoshi Takagi, Sagamihara; Akihiro Yamaguchi, Kamakura; Keizaburo Yamaguchi, Kawasaki; Yoshimitsu Tanabe, Yokohama; Hiroyuki Akahori, Yokosuka, all of Japan

[73] Assignee: Mitsui Toatsu Chemicals, Incorporated, Tokyo, Japan

[21] Appl. No.: 169,499

[22] Filed: Mar. 17, 1988

[30] Foreign Application Priority Data

| | | | |
|---|---|---|---|
| Mar. 24, 1987 | [JP] | Japan | 62-68070 |
| Jul. 27, 1987 | [JP] | Japan | 62-185621 |
| Aug. 17, 1987 | [JP] | Japan | 62-203042 |
| Oct. 23, 1987 | [JP] | Japan | 62-266454 |
| Oct. 27, 1987 | [JP] | Japan | 62-269410 |

[51] Int. Cl.[5] .......................... C08L 65/00; C08L 29/04; C08L 35/00

[52] U.S. Cl. .......................... 524/503; 524/504; 524/508

[58] Field of Search .......................... 524/503, 508, 504

[56] References Cited

U.S. PATENT DOCUMENTS

| | | | |
|---|---|---|---|
| 3,767,449 | 10/1973 | Hayashi et al. | 117/36.2 |
| 3,924,027 | 2/1975 | Saito et al. . | |
| 4,046,941 | 9/1977 | Saito et al. . | |
| 4,173,684 | 11/1979 | Stolfo | 428/531 |
| 4,269,893 | 5/1981 | Kato et al. . | |
| 4,748,259 | 5/1988 | Nachbur . | |
| 4,783,521 | 11/1988 | Yamaguchi | 528/206 |

FOREIGN PATENT DOCUMENTS

| | | |
|---|---|---|
| 264751 | 4/1988 | European Pat. Off. . |
| 268878 | 6/1988 | European Pat. Off. . |
| 2631832 | 1/1978 | Fed. Rep. of Germany . |
| 56-19792 | 2/1981 | Japan . |
| 61-271347 | 5/1985 | Japan . |
| 262019 | 11/1986 | Japan . |
| 6218 | 1/1987 | Japan . |
| 18472 | 1/1987 | Japan . |
| 19672 | 1/1987 | Japan . |
| 84045 | 4/1987 | Japan . |
| 62-87030 | 4/1987 | Japan . |
| 63-112537 | 5/1988 | Japan . |
| 63-132857 | 6/1988 | Japan . |
| 64-56724 | 3/1989 | Japan . |
| 64-77515 | 3/1989 | Japan . |
| 1571487 | 3/1980 | United Kingdom . |

OTHER PUBLICATIONS

Kogyo Kajaku Zaashi, 65(4), pp. 626–629 (1962).

Patent Abstracts of Japan, vol. 11, No. 136 (C–149) (2583) of Apr. 30, 1987.

*Primary Examiner*—C. Warren Ivy
*Attorney, Agent, or Firm*—Fisher, Christen & Sabol

[57] ABSTRACT

An aqueous suspension of a multivalent-metal-modified salicylic acid resin, which is suitable for use in the production of color-developing sheets for pressure-sensitive recording paper sheets, contains a specific multivalent-metal-modified salicylic acid resin at the first-mentioned resin. Fine particles of the specific multivalent-metal-modified salicylic acid is dispersed in an aqueous solution of a dispersant composed of at least one compound selected from the group consisting of:

(a) water-soluble anionic high-molecular compounds composed of polyvinyl alcohol derivatives containing sulfonic acid groups in their molecules, and salts thereof,
(b) acrylamide-modified polyvinyl alcohols, and
(c) water-soluble anionic high-molecular compounds composed of polymers or copolymers comprising particular styrenesulfonic acid derivatives as their essential components.

The aqueous dispersion is prepared by finely grinding the specific multivalent-metal-modified salicylic acid in the aqueous solution of the dispersant.

11 Claims, No Drawings

AQUEOUS SUSPENSION AND PREPARATION METHOD THEREOF

BACKGROUND OF THE INVENTION

1. Field of the Invention

This invention relates to an aqueous suspension suitable for use as a color-developing agent, more specifically, to an aqueous suspension of a multivalent-metal-modified salicylic acid resin having a novel composition and disclosed in any one of the present assignee's or applicant's preceding patent applications to be referred to subsequently, and notably, to an aqueous suspension of a novel oil-soluble multivalent-metal-modified salicylic acid resin, which is useful as a material for pressure-sensitive copying papers. This invention is also concerned with a method for the preparation of the above-mentioned aqueous suspension.

2. Description of the Related Art

A pressure-sensitive copying paper is generally composed of a sheet (CB-sheet) coated with microcapsules of a non-volatile organic solvent containing an electron-donating organic compound (so-called pressure-sensitive dyestuff) and another sheet (CF-sheet) coated with an aqueous coating formulation containing an electron-attracting color-developing agent. The CB-sheet and CF-sheet are arranged with their coated sides maintained in a contiguous relation. The microcapsules are ruptured, for example, by a writing or printing impression of a ballpoint pen or a typewriter, whereby the solution of the pressure-sensitive dyestuff is caused to flow out of the capsules and is then brought into contact with the color-developing agent and a color is hence produced. By changing the combination of the layer of the microcapsules containing the pressure-sensitive dyestuff and the layer of the color-developing agent, many copies can be produced and self-contained pressure-sensitive copying papers (SC paper sheets) can be produced.

As a colorless or slightly-colored dyestuff precursor useful in such pressure-sensitive copying papers, one or more compounds are selected from:

(1) triarylmethanephthalide compounds such as crystal violet lactone;
(2) fluorane compounds such as 3-dibutylamino-6-methyl-7-anilinofluorane;
(3) pyridylphthalide compounds;
(4) phenothiazine compounds; and
(5) leucoauramine compounds.

Said one or more compounds are dissolved in a hydrophobic phobic high boiling-point solvent and microencapsulated for their application.

As electron-attracting color-developing agents on the other hand, there have conventionally been used (1) inorganic solid acids such as acid clay and activated clay, (2) oil-soluble phenol-formaldehyde condensation products and their multivalent-metal-modified products and (3) multivalent metal salts of substituted salicylic acids by way of example. These color-developing agents cannot however provide marks having sufficient stability, so that produced color marks may be discolored or faded during their storage or their water resistance or solvent resistance may be insufficient.

As color-developing agents free of such problems, the present inventors have already found novel multivalent-metal-modified salicylic acids on which patent applications have been made [Japanese Patent Application No. 262019/1986 and others, which are the priority applications for U.S. patent application Ser. No. 111,763, filed on Oct. 23, 1987, and Japanese Patent Application No. 87030/1987].

In order to produce pressure-sensitive copying papers by using a color-developing agent, the color-developing agent is generally wet-ground in the presence of a surfactant into an aqueous suspension of fine particles having a particle size of 1-10 μm. A dispersant is used for this purpose.

The selection of the combination of particles to be dispersed and a dispersant for obtaining a good dispersion system is however based primarily on experiences, and there is no general rule for the selection. Upon selection of a dispersant, it is necessary to take into consideration not only dispersing effects but also influence and the like to the action of particles to be dispersed.

For these reasons, it is not easy to combine one of the multivalent-metal-modified salicylic acid resins with its matching dispersant to prepare an aqueous suspension having good properties in various aspects such as the state of dispersion, stability, color-developing ability, etc. Anionic high-molecular surfactants of the polycarboxylic acid type, specifically, the sodium salts of maleic anhydridediisobutyrene copolymers are generally employed as dispersants for p-phenylphenol-formaldehyde and p-octylphenol-formaldehyde polymers which are currently used as color-developing agents for pressure-sensitive recording paper sheets. When each of these surfactants is used as a dispersant for the conversion of any one of the multivalent-metal-modified salicylic acid resins into an aqueous suspension, the formation of an inconvenient complex salt takes place between the multivalent metal and the carboxylic acid salt. Hence, the dispersing effects and dispersion stability are reduced, hardly defoamable foams are formed, and the physical properties of the color-developing agent are changed due to modification of the multivalent-metal-modified salicylic acid resin as a dispersed substance. It is by no means possible to obtain any suspension which may be used practically.

Although some of salts of formaldehyde condensation products of naphthalenesulfonic acid, salts of ligninsulfonic acid and like salts, which were used previously for color-developing agents of the phenol-formaldehyde condensation products, have dispersing effects for the multivalent-metal-modified salicylic acid resins, they substantially lack practical utility because paper surfaces are colored or undergo light-yellowing due to the inclusion of the dispersant when employed in pressure-sensitive copying papers.

SUMMARY OF THE INVENTION

With a view toward solving the above-described problems, a principal object of this invention is to provide an aqueous suspension which is good in the state of dispersion, stability and the like and is usable very conveniently upon production of pressure-sensitive copying papers. Another principal object of this invention is to provide an aqueous suspension which permits the production of high-quality pressure-sensitive copying papers having high mark stability, water resistance and solvent resistance so that the sheet surfaces remain free from coloration, yellowing and the like and color marks produced thereon are not discolored or faded during their storage.

In one aspect of this invention, there is thus provided an aqueous suspension of a multivalent-metal-modified salicylic acid resin. The multivalent-metal-modified salicylic acid resin is selected from the group consisting of:

(A) first multivalent-metal-modified products of a salicylic acid resin comprising structural units represented by the following formulae (I) and (II):

Formula (I)

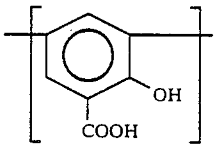

Formula (II)

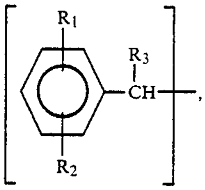, 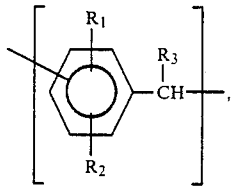,

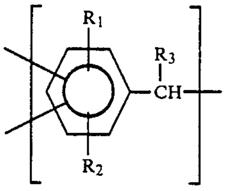 and/or 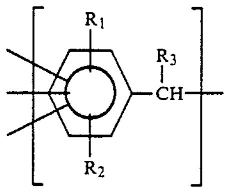

wherein $R_1$ and $R_2$ are independently a hydrogen atom or a $C_{1-12}$ alkyl, aralkyl, aryl or cycloalkyl group and $R_3$ denotes a hydrogen atom or a $C_{1-4}$ alkyl group, said structural units (I) and (II) accounting for 5–40 mole % and 60–95 mole % respectively, each of said structural units (I) being coupled with one of said structural units (II) via the α-carbon atom of said one of said structural units (II), one or more of said structural units (II) being optionally coupled via the α-carbon atom or α-carbon atoms thereof with the benzene ring or rings of another or other structural units (II), and said salicylic acid resin having a weight average molecular weight of 500–10,000, (B) second multivalent-metal-modified products of another salicylic acid resin comprising structural units represented by the following formulae (I), (II) and (III):

Formula (I)

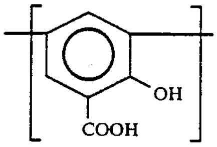

Formula (II)

-continued

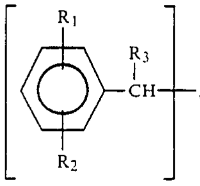, 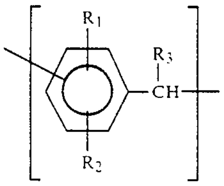

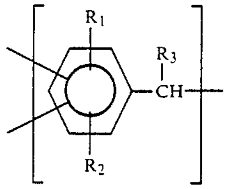 and/or 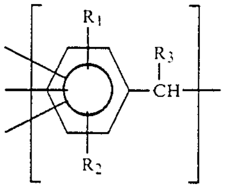

Formula (III)

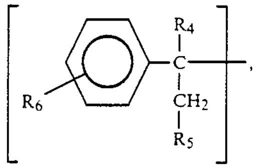,

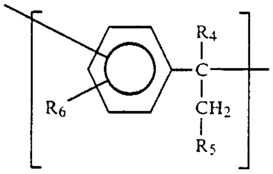 and/or

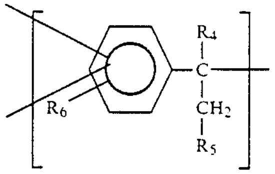

wherein $R_1$ and $R_2$ are independently a hydrogen atom or a $C_{1-12}$ alkyl, aralkyl, aryl or cycloalkyl group, $R_3$ and $R_6$ denote independently a hydrogen atom or a $C_{1-4}$ alkyl group and $R_4$ and $R_5$ are individually a hydrogen atom or a methyl group, said structural units (I), (II) and (III) accounting for 5–35 mole %, 10–85 mole % and 4–85 mole % respectively, each of said structural units (I) being coupled with one of said structural units (II) via the α-carbon atom of said one of said structural units (II), one or more of said structural units (II) being optionally coupled via the α-carbon atom or α-carbon atoms thereof with the benzene ring or rings of another or other structural units (II), each of said structural units (III) being coupled via the α-carbon thereof with the benzene ring of one of the structural units (II) and/or (III), and said another salicyclic acid resin having a weight average molecular weight of 500–10,000, and (c) third multivalent-metal-modified products of a further salicyclic acid resin comprising structural units represented by the following formulae (IV) and (V):

Formula (IV):

-continued
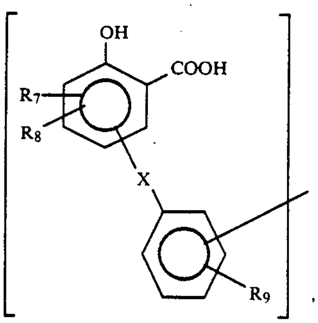
,
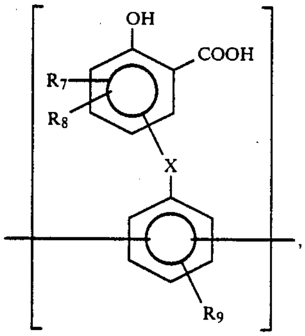
,
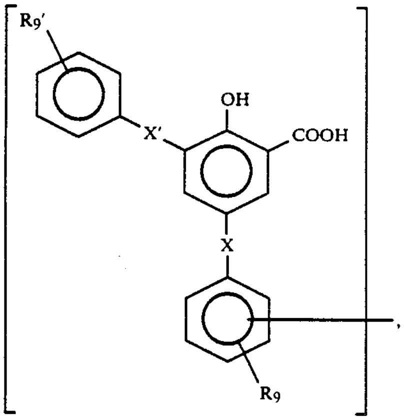
,
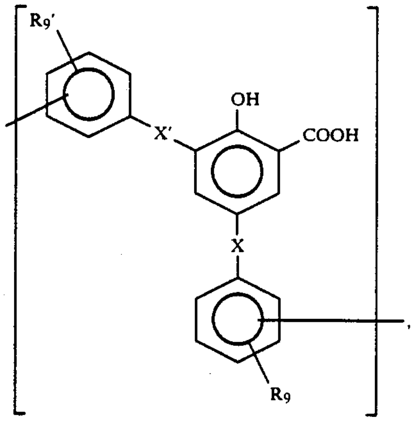
,
-continued
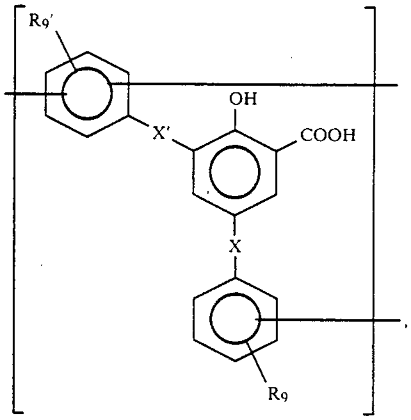
,
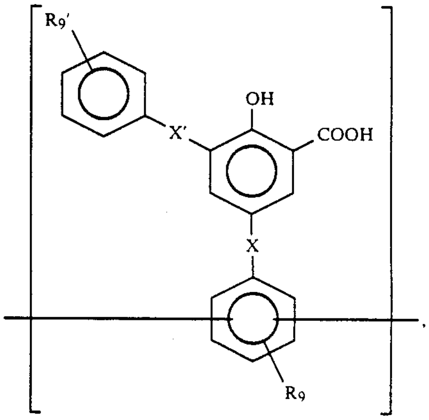
,
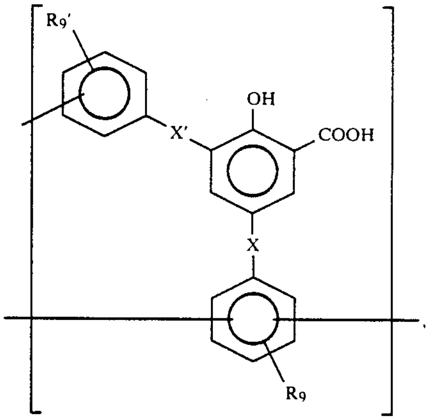
, -continued

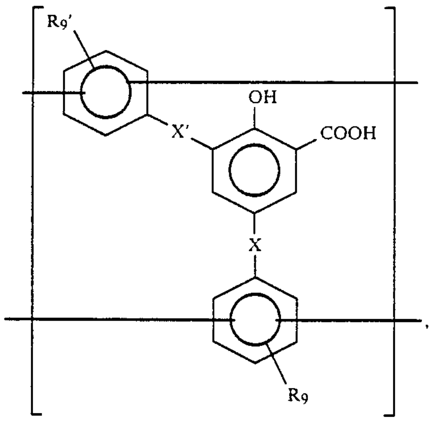

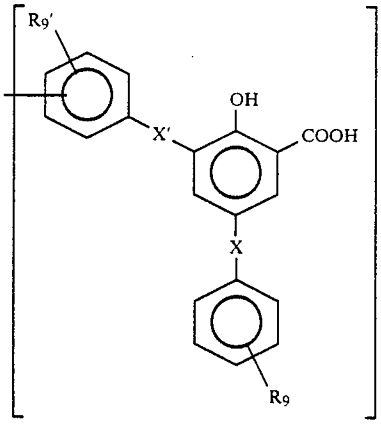

and/or

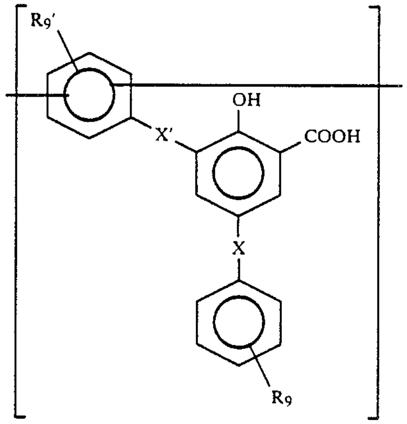

Formula (V):

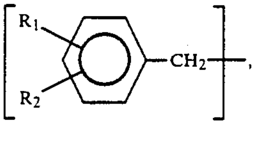

,

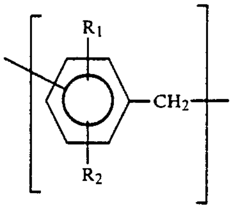

and/or

-continued

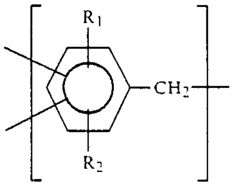

wherein $R_1$, $R_2$, $R_7$, $R_8$, $R_9$ and $R_9'$ are independently a hydrogen atom or a $C_{1-12}$ alkyl, aralkyl, aryl or cycloalkyl group, $R_7$ and $R_8$ may optionally be bonded to adjacent carbons of the corresponding benzene ring and form a ring together with the adjacent carbons, and X and X' denote independently a direct bond or a straight-chain or branched divalent $C_{1-5}$ hydrocarbon group, said structural units (IV) and (V) accounting for 10-70 mole % and 30-90 mole % respectively, each of said structural units (V) being coupled with one of said structural units (IV) and/or (V) via the α-carbon atom of said one of said structural units (V), and said further salicylic acid resin having a weight average molecular weight of 500-10,000; and the multivalent-metal-modified salicylic acid resin is dispersed as fine particles in an aqueous solution of a dispersant composed of at least one compound selected from the group consisting of:

(a) water-soluble anionic high-molecular compounds composed of polyvinyl alcohol derivatives containing sulfonic acid groups in their molecules, and salts thereof, (b) acrylamide-modified polyvinyl alcohols, and (c) water-soluble anionic high-molecular compounds composed of polymers or copolymers comprising as their essential components styrenesulfonic acid derivatives represented by the following general formula (VI):

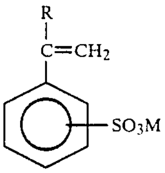

(VI)

wherein R is a hydrogen atom or a $C_{1-5}$ alkyl group and M denotes $Na^+$, $K^+$, $Li^+$, $Cs^+$, $Rb^+$, $Fr^+$ or $NH_4^+$.

In another aspect of this invention, there is also provided a method for the preparation of the above-described aqueous suspension. The multivalent-metal-modified salicylic acid resin selected from the group consisting of the products (A), (B) and (C) is finely ground in the aqueous solution of the dispersant composed of at least one compound selected from the group consisting of the compounds (a) and (c) and the acrylamide-modified polyvinyl alcohols (b).

The particle size of the multivalent-metal-modified salicylic acid resin in the aqueous suspension of the present invention may be 0.5-1.0 μm. The solid content of the aqueous suspension may be 10-70 wt. %, preferably, 30-60 wt. %. The compound used as the dispersant may be contained in an amount of 0.3-30 parts by weight, preferably, 2-20 parts by weight per 100 parts by weight of the multivalent-metal-modified salicylic acid resin.

A color-developing sheet making use of the aqueous suspension of this invention has either equal or better color-producing property compared with color-developing sheets obtained by using an inorganic solid acid or p-phenylphenol novolak resin, is better in low-temperature color-producing property compared with color-developing sheets obtained by using a metal salt of an aromatic carboxylic acid, and can produce color marks having high fastness so that they are not readily faded out by water, plasticizers or light.

The yellowing problem which takes place upon exposure to sunlight has also been improved. In particular, the yellowing by $NO_x$ in air has been improved significantly. The aqueous suspension of this invention therefore has a merit that it can economically provide color-developing sheets extremely advantageous for handling and storage.

DETAILED DESCRIPTION OF THE INVENTION AND PREFERRED EMBODIMENTS

The multivalent-metal-modified salicylic acid resin products (A) and (B) [hereinafter abbreviated merely as "resin (A)" and "resin (B)"] useful in the practice of this invention will be described. The resins (A) and (B) have already been described in detail in the specification of Japanese Patent Application No. 262019/1986 and others (corresponding to U.S. patent application Ser. No. 111,763) referred to above, regarding their preparation processes, their performances when employed as color-developing agents, etc.

The resin (A) may be prepared, for example, by condensing, in the presence of an acid catalyst, salicyclic acid with a benzyl alcohol or benzyl ether represented by the following general formula (VIII):

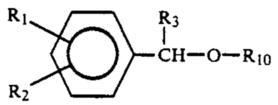

(VIII)

wherein $R_1$, $R_2$ and $R_3$ are the same as defined above in the general formula (II) and $R_{10}$ denotes a hydrogen atom, $C_{1-4}$ alkyl group or

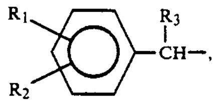

or a mixture thereof or with a benzyl halide represented by the following general formula (IX):

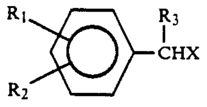

(IX)

wherein $R_1$, $R_2$ and $R_3$ are the same as defined above in the general formula (II) and X denotes a halogen atom, and then converting the resultant salicyclic acid resin into the multivalent-metal-modified product.

The resin (B) may be prepared, for example, by condensing a resin, which has been obtained likewise the synthesis of the salicylic acid resin of the resin (A) before its conversion to the multivalent-metal-modified product, with a styrene derivative represented by the following general formula (X):

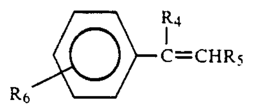

(X)

wherein $R_4$, $R_5$ and $R_6$ are the same as defined above in the general formula (III), in the presence of an acid catalyst, and then converting the resultant salicylic acid resin into the multivalent-metal-modified product.

As specific examples of the salicylic acid resin in the resin (B), may be mentioned salicylic acid-p-methyl-α-benzylalcohol-styrene resins, salicylic acid-benzyl methyl ether-styrene resins, salicylic acid-benzyl alcohol-a-methylstyrene resins, salicylic acid-benzyl alcohol-styrene resins, salicylic acid-p-methylbenzyl methyl ether-styrene resins, salicylic acid-α-methylbenzyl alcohol-styrene resins, salicylic acid-α-methylbenzyl ethyl ether-α-methylstyrene resins, etc.

The term "multivalent-metal-modified product of salicylic acid resin" or "multivalent-metal-modified salicylic acid resin" means either a salt formed between multivalent metal ions and intramolecular or intermolecular carboxyl groups of the salicylic acid resin or a molten mixture containing the multivalent metal salt.

Several known processes may be applied for the preparation of the multivalent metal salt from the salicylic acid resin. For example, it may be prepared by reacting an alkali metal salt of the resin with a water-soluble multivalent metal salt in water or a solvent in which the alkali metal salt and multivalent metal salt are both soluble. Namely, it may be prepared by reacting the salicylic acid resin with the hydroxide or carbonate of an alkali metal, an alkoxide of an alkali metal, or the like to obtain the alkali metal salt of the salicylic acid resin or a solution of the alkali metal salt in water, an alcohol or a mixed water-alcohol solvent, followed by a further reaction with the water-soluble multivalent metal salt.

The multivalent-metal-modified product may also be obtained by neutralizing the resin without its separation after the condensation and hence reacting the resin with a multivalent metal salt employed as a Friedel-Crafts catalyst.

The molten mixture containing the multivalent metal salt of the salicylic acid resin may be produced by mixing the salicylic acid resin with a multivalent metal salt of an organic carboxylic acid such as formic acid, acetic acid, propionic acid, valeric acid, capric acid, stearic acid or benzoic acid, reacting them under heat in a molten state, and then cooling the resultant reaction mixture. In some instances, a basic substance, for example, ammonium carbonate, ammonium bicarbonate, ammonium acetate or ammonium benzoate may be added, followed by a further reaction under heat in a molten state.

As an alternative, the molten mixture may also be prepared by using salicylic acid and the carbonate, oxide or hydroxide of a multivalent metal, heating, melting and reacting them with a basic substance, e.g., the ammonium salt of an organic carboxylic acid, such as ammonium formate, ammonium acetate, ammonium caproate, ammonium stearate or ammonium benzoate, and then cooling the reaction mixture.

As preferred multivalent metals, may be mentioned calcium, magnesium, aluminum, copper, zinc, tin, barium, cobalt, nickel, etc. Among these, zinc is particularly preferred.

Of multivalent-metal-modified salicylic acid resins obtained in the above-described manner, are generally employed those having a softening point of 50° C. -120° C. as measured in accordance with the ring and ball softening-point measuring method prescribed in JIS K-2548 (softening points to be referred to hereinafter will all mean those determined by this method).

The multivalent-metal-modified salicyclic acid resin product (C) [hereinafter abbreviated merely as "resin (C)"] useful in the practice of this invention will next be described.

As already mentioned above, the present applicant or assignee has disclosed its composition, its preparation process, its performance as a color-developing agent, etc. in Japanese Patent Application No. 87030/1987. The preparation process may be outlined as follows. A salicyclic acid derivative represented by the following general formula (XI):

(XI)

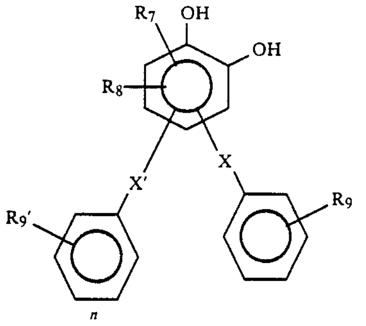

wherein $R_7$, $R_8$, $R_9$, $R_9'$, X and X' are the same as defined above in the general formula (IV) and n stands for 1 or 0 is reacted in the presence of a Friedel-Crafts catalyst with a benzyl halide represented by the following general formula (XII):

(XII)

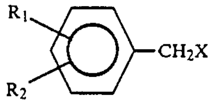

wherein $R_1$ and $R_2$ are the same as defined above in the general formula (V) and X is a halogen atom. The resulting resin composition is then converted into its multivalent-metal-modified product in the same manner as that described in the preparation processes of the resins (A) and (B). Preferred multivalent metals and the softening point of the multivalent-metal-modified product are the same as those described in connection with the resins (A) and (B).

At least one of the following compounds is also used in the practice of this invention.

(a) Water-soluble anionic high-molecular compounds composed of polyvinyl alcohol derivatives containing sulfonic acid groups in their molecules or salts thereof, (b) Acrylamide-modified polyvinyl alcohols, and (c) Water-soluble anionic high-molecular compounds composed of polymers or copolymers comprising as their essential components styrenesulfonic acid derivatives represented by the following general formula (VI):

(VI)

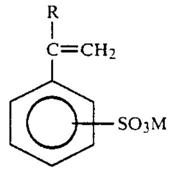

wherein R is a hydrogen atom or a $C_{1-5}$ alkyl group and and M denotes $Na^+$, $K^+$, $Li^+$, $Cs^+$, $Rb^+$, $Fr^+$ or $NH_4^+$.

The compounds (a), (b) and (c) act individually as a dispersant for the resin (A), (B) or (C) in the suspension of this invention. These compounds will hereinafter be abbreviated as "dispersants (a)" "dispersants (b)" and "dispersants (c)" respectively and described in detail.

(i) Dispersants (a)

The dispersants (a) may each be prepared, for example, by any one of the following processes:

(1) Vinyl acetate is copolymerized with an α, β-unsaturated monomer containing at least one sulfonic acid group in its molecule, followed by saponification.

(2) Polyvinyl alcohol is reacted with concentrated sulfuric acid.

(3) Polyvinyl alcohol is oxidized with bromine, iodine or the like, followed by a reaction with acidic sodium sulfite.

(4) An aldehyde compound containing one or more sulfonic acid groups is reacted with polyvinyl alcohol in the presence of an acid catalyst, whereby polyvinyl alcohol is converted into a sulfoacetal.

Among dispersants (a) obtained by the above processes, it is preferable to use those obtained by saponifying copolymers of vinyl acetate and α,β-unsaturated monomers containing one or more sulfonic acid groups.

As specific examples of α, β-unsaturated monomers containing one or more sulfonic groups, may be mentioned:

(a) sulfoalkyl acrylates, for example, sulfoethyl acrylate and sulfoethyl methacrylate;

(b) vinylsulfonic acid, styrenesulfonic acid and allylsulfonic acid;

(c) Maleinimide-N-alkanesulfonic acids; and (d) 2-acrylamido-2-methylpropanesulfonic acid and 2-acrylamido-2-phenylpropanesulfonic acid.

The dispersants (a) may each be obtained by copolymerizing such an α, β-unsaturated monomer in a proportion of 0.5-20 moles, preferably, 1-10 moles per 100 moles of vinyl acetate and then saponifying (50-100%) the vinyl acetate moieties under alkaline conditions by a method known per se in the art.

As an alternative, they may also be obtained individually by sulfonating a copolymer of vinyl acetate and an aromatic α, β-unsaturated monomer such as styrene and then saponifying the thus-sulfonated copolymer. The dispersants (a) also include high molecular compounds obtained individually by copolymerizing vinyl acetate with an α, β-unsaturated monomer containing at least one sulfonic acid group in its molecule and another α, β-unsaturated monomer.

In this invention, the sulfonic acid groups in the molecule of dispersant (a) are generally employed in such a form that their sulfonic acid groups have been converted into the alkali metal ($Na^+$, $K^+$, $Li^+$, $Cs^+$, $Rb^+$ or $Fr^+$) or $NH_4^+$ salts.

Unlike conventional completely- or partly-saponified polyvinyl alcohols, each of the dispersants (a) has high solubility in water and is hence dissolved easily in water, shows less viscosity variations over a wide pH range, is substantially colorless or colored in an extremely pale color and thus does not color an aqueous suspension of a multivalent-metal-modified salicyclic acid resin to be obtained by using the same, and accordingly does not color pressure-sensitive copying paper sheets (CF-sheets) to be produced by using the aqueous suspension. With the own characteristics of the dispersants (a) that they are neither modified nor discolored under severe environmental conditions, they have excellent dispersing effects for the multivalent-metal-modified salicyclic acid resins useful in the practice of this invention. They can therefore provide aqueous suspensions of the multivalent-metal-modified salicylic acid resins, which suspensions are stable thermally, mechanically and chemically.

Different from completely-saponified polyvinyl alcohols, partly-saponified polyvinyl alcohols and carboxyl-modified polyvinyl alcohols which are employed generally, the dispersants (a) have lower foaming tendency and are superb in self-defoaming property. The dispersants (a) can therefore eliminate troubles which would otherwise arise due to foams in the course of a dispersing operation.

The dispersants (a) are equipped with both anionic and nonionic properties and have not only excellent dispersing effects but also protective colloidal effects. Dispersions obtained by using the dispersants (a) are far superior in mechanical stability and thermal stability to dispersions making use of other anionic surfactants.

The polyvinyl alcohols which have sulfonic acid groups in their molecules and are useful in the present invention are generally available as either white or light-colored powders soluble readily in water or as aqueous solutions. Upon production of aqueous suspensions, they are beforehand dissolved separately in water and then adjusted to a pH range of 4–10, preferably, 6–9 prior to their use.

(ii) Dispersants (b)

Each of the dispersants (b) may generally be obtained by copolymerizing vinyl acetate and acrylamide and then saponifying the resultant copolymer. It is therefore possible to obtain those having varied average molecular weights and acrylamide contents.

The dispersants (b) useful in the practice of this invention have an average polymerization degree of 200–2000, preferably, 500–1500 and an acrylamide content of 2–30 mole %, preferably, 3–15 mole %.

Since the dispersants (b) usable in the present invention themselves are substantially colorless or extremely light-colored, they do not color the resultant aqueous suspensions of multivalent-metal-modified salicylic acid resins. Accordingly, they do not color pressure-sensitive copying papers to be produced by using the aqueous suspensions separately. With their own characteristics that they are neither modified nor discolored under severe environmental conditions, they have excellent dispersing effects for the resin (A), (B) or (C) and provide aqueous suspensions of the multivalent-metal-modified salicylic acid resins, which suspensions are stable thermally, mechanically and chemically.

Different from conventional completely- or partly-saponified polyvinyl alcohols and carboxyl-modified polyvinyl alcohols, the dispersants (b) have lower foaming tendency and are superb in self-defoaming property. The dispersants (b) can therefore eliminate troubles which would otherwise arise due to foams in the course of a dispersing operation.

Each of the dispersants (b) also has a function as a binder for binding an aqueous formulation, which has been obtained by mixing the aqueous suspension of this invention with an inorganic pigment or the like, to paper.

In this invention, one or more of other anionic and/or nonionic surfactants, one or more high-molecular surfactants or one or more water-soluble high molecular compounds having protective colloidal effects may also be used in combination in order to control the viscosity and rheological characteristics of the aqueous suspension to be obtained.

The dispersants (b) are generally available as either white or light-colored powders soluble readily in water or as aqueous solutions. Upon production of aqueous suspensions, they are beforehand dissolved separately in water and then adjusted to a pH range of 4–10, preferably, 6–9 prior to their use.

(iii) Dispersants (c)

The water-soluble anionic high-molecular compounds useful as the dispersants (c) in this invention include a group of substances known as agents for imparting electrical conductivity to electrophotographic paper sheets and electrostatic recording paper sheets. However, it has not been known at all that they exhibit superb properties when employed as dispersants, especially, for forming multivalent-metal-modified salicylic acid resins into aqueous suspensions according to this invention.

As suitable specific examples, may be mentioned salts of polystyrenesulfonic acid derivatives represented by the following general formula (VII):

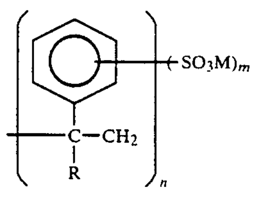

(VII)

wherein R is a hydrogen atom or a $C_{1-5}$ alkyl group, M denotes $Na^+$, $K^+$, $Li^+$, $Cs^+$, $Rb^+$, $Fr^+$ or $NH_4^+$, n stands for an integer of 5–10,000, m is an integer ranging from 1 to 10,000 but not exceeding n, and one or more of the Rs in each molecule may be different from the rest of the Rs. Preparation processes of such inorganic salts of polystyrenesulfonic acid derivatives may include the sulfonation of polystyrene and polymerization of styrenesulfonic acid (or a salt thereof).

Besides, salts of copolymers of styrenesulfonic acid and maleic anhydride, salts of sulfonation products of styrene-maleic acid copolymers, salts of copolymers of styrenesulfonic acid and other vinyl compounds, salts of sulfonated products of copolymers of styrene and other vinyl monomers, etc. may be used. Two or more of these salts may also be used in combination.

The dispersants (c) useful in the present invention are stable over a wide pH range and have an extremely light color. They hence do not color aqueous suspensions of the resin (A), (B) or (C), which are to be obtained by using them. Accordingly, they do not color pressure-sensitive copying papers (CF-sheets) which are to be produced by using the aqueous suspensions separately. With the characteristics of the dispersants (c) that they are neither modified nor discolored under severe environmental conditions, they have excellent dispersing effects for the resin (A), (B) or (C). Among these dispersants, the inorganic salts of polystyrenesulfonic acid derivatives represented by the general formula (VII) can be employed preferably because they can provide particularly good aqueous suspensions of the resin (A), (B) or (C) and they are readily available.

In the present invention, the resin (A), (B) or (C) having excellent properties can be converted into an aqueous suspension having a high solid content, a low viscosity and superb dispersion stability by finely wet-grinding the resin in an aqueous solution which uses as a dispersant a water-soluble anionic high-molecular substance comprising a polymer or copolymer composed as an essential component of a styrenesulfonic acid derivative represented by the general formula (VI).

Further, one or more of other anionic and/or nonionic surfactants or one or more water-soluble high molecular compounds having protective colloidal effects may also be used in combination in order to control the viscosity and rheological characteristics of the aqueous suspension.

Such dispersants(c) are generally available as either white or light-colored powders soluble readily in water or as aqueous solutions. Upon production of aqueous suspensions, they are beforehand dissolved separately in water and then adjusted to a pH range of 4–10, preferably, 6–9 prior to their use.

In order to produce an aqueous suspension of the resin (A), (B) or (C) by using the dispersant (a), (b) and/or (c) (hereinafter simply referred to as "dispersant"), the resin (A), (B) or (C) is charged to a concentration of 10–70 wt. %, preferably, 30–60 wt. % into a solution which has been formed by dissolving the dispersant in water and then adjusting the pH of the resultant solution to 4–10, preferably, 6–9. The resultant mixture is stirred into a slurry and is then finely wet-ground to an average particle size of 0.5–10 μm by means of a wet-grinding apparatus, for example, an apparatus designed to perform wet-grinding by means of a spherical grinding medium, such as a ball mill, attritor or sand grinder, whereby an aqueous suspension is formed. Such fine wet-grinding may be performed batchwise or continuously. The fine wet-grinding is continued until a desired particle size is achieved.

Where the softening point of the resin (A), (B) or (C) is so low that it is liquefied easily at a temperature not higher than the boiling point of water, an aqueous suspension can be obtained by stirring the multivalent-metal-modified salicylic acid resin at a high speed in warm or hot water to emulsify the resin in water and then cooling the emulsion thus formed.

One or more of other anionic and/or nonionic surfactants or one or more water-soluble high molecular compounds having protective colloidal effects may also be used in combination in order to control the viscosity and rheological characteristics of the aqueous suspension.

The amount of the dispersant to be used varies depending on the kind and physical properties of the material [the resins (A), (B) or (C)] to be dispersed and the physical properties (solid concentration, the viscosity of the material dispersed, etc.) of the intended aqueous suspension, and no particular limitation is imposed thereon. In order to obtain a practical aqueous suspension (solid content: 30–60 wt. %, average particle size: 0.5–10 μm), the dispersant may be used in an amount of 0.3–30 parts by weight, preferably, 2–20 parts by weight per 100 parts by weight of the resin (A), (B) or (C).

Further, the average particle size of the multivalent-metal-modified salicylic acid resin in the aqueous suspension may be 10 μm or smaller, preferably, in a range of 0.5–5 μm. If particles greater than 10 μm are contained in a large proportion, more sediment occurs while the aqueous suspension is stored standstill. In addition, the color-producing performance, especially, the concentration of a color immediately after its production is reduced. If the particle is smaller than 0.5 μm, the aqueous suspension shows a thickening behavior. It is hence difficult to form a thick aqueous suspension and also to handle the resultant aqueous suspension.

The dispersants useful in the practice of this invention do not exhibit thickening tendency (shock) when mixed with a dispersion of another component, for example, a white inorganic pigment such as kaolin or calcium carbonate upon preparation of a coating formulation suitable for use in the production of pressure-sensitive copying papers.

The aqueous suspension obtained in the above manner, which pertains to the present invention and contains the multivalent-metal-modified salicylic acid resin, can have a higher solid content and a lower viscosity. The aqueous suspension can therefore provide an aqueous coating formulation of a higher solid content for the production of pressure-sensitive copying paper. The aqueous coating formulation can therefore be applied especially by a coating machine of the type that the coating is performed by using an aqueous coating formulation of a high solid content, such as blade coater or roll coater.

Pressure-sensitive copying papers produced from the aqueous coating formulation making use of the aqueous suspension of the present invention enjoy improved color-producing performance and owing to the low thickening tendency of the aqueous coating formulation, substantial effects have also been brought about for the improvement of the efficiency of coating work.

The air-knife coating method making use of a low-viscosity coating formulation is convenient, since foaming is significantly suppressed upon recirculation of the aqueous coating formulation.

Although the dispersants (a), (b) and (c) individually show excellent performance as has been described above, they may also be used in combination. The combined use generally makes it possible to reduce the amount of a dispersant to be used upon formation of an aqueous suspension. It is hence possible to obtain an aqueous suspension of a multivalent-metal-modified salicylic acid resin, which is more stable compared with those available by using the dispersants singly.

When the dispersants (a) and (b) are used in combination, an extremely-stable aqueous suspension can be obtained by using them in a total amount of 10 parts by weight or less per 100 parts by weight of each resin.

Upon production of pressure-sensitive copying papers by using the aqueous suspension of this invention, in order to adjust the characteristics of the surfaces of the pressure-sensitive copying papers to be obtained, (1) an inorganic or organic pigment, (2) a pigment dispersant, (3) a coating binder and (4) various additives are mixed first of all to prepare an aqueous coating formulation suitable for a coating method to be employed. A base paper web is thereafter coated with a coating formulation, followed by drying into the pressure-sensitive copying papers.

As the inorganic or organic pigment (1) employed here, may be mentioned kaolin, calcined kaolin, bentonite, talc, calcium carbonate, barium sulfate, aluminum oxide (alumina), silicon oxide (silica), satinwhite, titanium oxide, polystyrene emulsion or the like. Illustrative examples of the pigment dispersant (2) useful here may include phosphates such as sodium methaphosphate, sodium hexamethaphosphate and sodium tripholyphosphate as well as polycaroxylates such as sodium polyacrylate. As exemplary coating binders (3), may be used denatured starches such oxidized starch, enzyme-converted starch, starch urea phosphate and alkylated starch, water-soluble proteins such as casein and gelatin, and synthetic and semi-synthetic binders such as styrene-butadiene latex (SBR), methyl methacrylate-butadiene latex (MBR), emulsions of vinyl acetate polymers, polyvinyl alcohol, carboxymethylcellulose, hydroxyethylcellulose and methylcellulose. As various other additives, fluorescent brightening agents, defoaming agents, viscosity modifiers, anti-dusting agents, lubricants, waterproofing agents, etc. may be employed.

By an air-knife coater, blade coater, brush coater, roll coater, bar coater, gravure coater or the like, a base paper web is coated with the aqueous coating formulation prepared by mixing the aqueous suspension of this invention and the above-mentioned various components and dispersing the latter in the former. The thus-coated paper web is then dried to form color-developing sheets for pressure-sensitive copying papers.

The aqueous coating formulation may generally be coated to give a dry coat weight of at least 0.5 $g/m^2$, preferably, 1–10 $g/m^2$. The color-producing properties of a sheet coated with the aqueous coating formulation are governed primarily by the concentration of the multivalent-metal-modified salicylic acid resin contained in the aqueous coating formulation. Dry coat weights greater than 10 $g/m^2$ are not effective for the improvement of the color-producing properties and are disadvantageous from the economical standpoint.

The superiority of the aqueous suspension of this invention for the production of pressure-sensitive paper sheets is appreciated from the following advantageous effects. For example, the aqueous suspension of this invention has little thickening tendency and the efficiency of coating work of an aqueous coating formulation formed principally of the aqueous suspension has been improved considerably. The use of the air-knife coating method, which uses a low-viscosity coating formulation at the time of coating work, is convenient for coating the aqueous coating formulation making use of the aqueous suspension of this invention, since the foaming is suppressed significantly upon recirculation of the aqueous coating formulation. The aqueous suspension of this invention does not exhibit thickening tendency (shock) when it is mixed with other common components, for example, a white inorganic pigment such as kaolin clay or calcium carbonate upon preparation of an aqueous coating formulation suitable for use in the production of pressure-sensitive copying papers. In addition, the aqueous suspension has a high solid content and is excellent in thermal stability. An aqueous coating formulation making use of the aqueous suspension is hence superb in both thermal and mechanical stability and can be employed suitably for a coating machine which performs coating work by using an aqueous coating formulation of a high solid content, especially, for a blade coater or roll coater.

Novel color-developing sheets, which have been produced by using the aqueous suspension of this invention and are suited for use in pressure-sensitive copying papers, have various advantages. For example, they have either equal or better color-producing ability compared with color-developing sheets making use of an inorganic solid acid or p-phenylphenol novolak resin. The yellowing resistance upon exposure to sunlight has also been improved substantially, so that they are extremely advantageous in handling and storage.

EXAMPLES

The present invention will hereinafter be described in detail by the following Examples and Comparative Examples.

Properties of aqueous suspensions, aqueous coating formulations and pressure-sensitive copying papers obtained in the following Examples and Comparative Examples will be summarized in Tables 1-3.

The following testing methods were employed for the determination of the respective properties.

(A) Properties of aqueous suspensions

(I) Hue

A wood free paper web was coated with each aqueous suspension by using Meyer bar to give a dry coat weight of 5 $g/m^2$. Four sheets cut off from the thus-coated paper web (i.e., sheets coated with the aqueous suspension) were superposed one over another and the reflectivity was measured by a Hunter colorimeter, Model TSS (manufactured by Toyo Seiki Seisakusho, Ltd.) through a blue filter. The whiteness of the sheets coated with the aqueous suspension will be expressed in terms of reflectivity (A).

Higher reflectivity (A) indicates that the corresponding aqueous suspension has greater whiteness. The superiority or inferiority between two aqueous suspensions can be distinguished visually so long as their difference in reflectivity is about 1% or greater.

(II) Viscosity

After adjusting the solid content of each aqueous suspension to 40 wt. %, its viscosity was measured at 60 rpm by a Brookfield viscometer equipped with a No. 1 rotor. The viscosity is expressed by a figure thus measured in centipoises.

(III) High-temperature storage stability

Two killograms of each aqueous suspension were placed in a stainless beaker having an internal capacity of 3 l. The aqueous suspension was stored there at 40° C. for 1 week while stirring it at 100 rpm by a glass-made stirring blade (anchor type; diameter: 100 mm). Its filterability before the storage and that after the storage were compared in terms of the filtration time (sec) through a 200 mesh sieve whose diameter was 7.5 cm. In a dispersion having poor high-temperature storage stability, the particles of the multivalent-metal-modified salicylic acid resin coagulated together so that as the particle size grew further, the filtration time became longer and the filterability was reduced.

(B) Properties of aqueous coating formulations

Using the aqueous suspensions of the Examples and Comparative Examples separately, were prepared aqueous coating formulations of the following composition (solid content: 50%) suitable for use in the production of pressure-sensitive copying papers by the blade coating method. Their properties were then measured separately.

| | Components | parts by weight |
|---|---|---|
| (1) | Aqueous suspension (in terms of the multivalent-metal-modified salicylic acid resin | 18 |
| (2) | Light calcium carbonate | 100 |
| (3) | Styrene-butadiene latex | 6 |
| (4) | Oxidized starch | 6 |
| (5) | Sodium polyacetate (pigment dispersant) | 0.5 |

(I) Viscosity

The occurrence or non-occurrence of thickening was determined by a Brookfield viscometer (No. 3 rotor; 60 rpm). The preferable viscosity is in a range of 300–1000 cps.

(II) Mechanical stability

Using each of the above-described 50% solid aqueous coating formulations, the amount of agglomerates formed was measured by a Marron mechanical stability testing machine in accordance with JIS K-6392 (Testing Method for NBR Synthetic Latexes) to obtain an index of the mechanical stability of the aqueous coating formulation.

Testing conditions 100 g sample, 1000 rpm, 10 min, 20 kg load. Subsequent to the test, the aqueous coating formulation was caused to pass through a 200 mesh sieve for its filtration. The weight of agglomerates was measured after drying them in an oven. The amount of the agglomerates is expressed in terms of amount (%) of agglomerates formed.

Aqueous coating formulations indicated a large amount (%) of agglomerates formed by the above testing method tend to develop coating troubles due to disruption of their dispersion, agglomeration of their solid components, etc. when they are applied at a high-speed and subjected to a strong shear force, for example, by the blade coating or gate roll coating method.

(C) Properties as pressure-sensitive copying papers

Wood free paper webs were coated by a Meyer bar at a rate of dry coat weight of 6 g/m$^2$ respectively with the aqueous coating formulations which had been tested by a homomixer with respect to their mechanical and thermal stability as described above. The thus-coated paper webs were then dried to obtain color-developing sheets for pressure-sensitive copying papers of the multiple sheet type.

(I) Densities of colors produced and color-producing speeds

In the case of the color-developing sheets for pressure-sensitive copying papers of the multiple sheet type, the coated side of color-developing sheet was brought into a contiguous relation with the coated side of a commercial CB-sheet ("NW-40T", trade name; product of Jujo Paper Co., Ltd.) which contained crystal violet lactone (CVL) as a principal pressure-sensitive dyestuff. Wood free paper sheets were then placed on the top and under the bottom of the thus-combined color-developing sheet and CB-sheet. On the other hand, each self-contained pressure-sensitive copying paper was sandwiched between wood free paper sheets. Each pressure-sensitive copying paper was caused to develop a cobalt blue color by an electric typewriter, and its reflectivity was measured by the Hunter colorimeter, Model TSS, through an amber filter. The measurement of the density of the thus-produced color was conducted on the 1st minute after the application of the typewriter impression and also on the 20th hour after the color production. The density of the color thus produced is expressed in terms of initial color production rate ($J_1$) and final color production rate ($J_2$):

$$J_1 = \frac{I_0 - I_1}{I_0} \times 100(\%)$$

$$J_2 = \frac{I_0 - I_2}{I_0} \times 100(\%)$$

Where $I_O$: reflectivity before the color production, $I_1$: reflectivity on the 1st minute after the color production, and $I_2$: reflectivity on the 20th hour after the color production.

The color-producing speed and color density are more preferred as the difference between the initial color production rate and the final color production rate is smaller and the final color production rate is greater.

(II) Whiteness of color-developing sheets

Four color-developing sheets coated and dried in the above-described manner were superposed one over another, and the reflectivity was measured by the Hunter colorimeter through a blue filter. The whiteness of each color-developing sheet is expressed in terms of reflectivity (F). A greater F indicates that the color-developing sheet is whiter. The difference in whiteness between two color-developing sheets can be distinguished visually so long as the difference in reflectivity is about 0.5% or greater.

(III) Light yellowing resistance

Each color-developing sheet, which had not been used for the production of a color, was exposed for 10 hours to sunlight. Its reflectivity $K_1$ before the exposure and its reflectivity $K_2$ after the exposure were measured by the Hunter colorimeter through a blue filter. The difference between $K_1$ and $K_2$ indicates the degree of yellowing of the color-developing sheet, which can be attributed to the photo-oxidative yellowing of the multivalent-metal-modified salicylic acid resin and the light yellowing of the dispersant.

The degree of the light yellowing is expressed by $\Delta K = K_1 - K_2$. Smaller $\Delta K$ indicates less light yellowing of a color-developing sheet.

(IV) Yellowing by $NO_x$

Following JIS L-1055 (Testing Method of $NO_x$—Resistant Color Fastness of Dyed Products and Dyes), each color-developing sheet was stored for 1 hour in a sealed container of an $NO_x$ gas atmosphere formed by the reaction between $NaNO_2$ (sodium nitrite) and $H_3PO_4$ (phosphoric acid). Then the degree of yellowing was investigated.

The reflectivity was measured by the Hunter colorimeter through a blue filter both before and on the 1st hour after its treatment with the $NO_x$ gas.

The smaller the difference between the reflectivity $L_1$ before the treatment and the reflectivity $L_2$ after the treatment, i.e., $\Delta L = L_1 - L_2$, the less the yellowing of a color-developing sheet.

Synthesis Examples of metal-modified salicylic acid resins employed in the Examples and Comparative Examples will next be given.

SYNTHESIS EXAMPLE A-1

A glass-made reactor was charged with 27.6 g (0.2 mole) of salicylic acid, 253.2 g (2 moles) of benzyl chloride and as a catalyst, 1.5 g of anhydrous zinc chloride They were condensed at 70°-90° C. for 3 hours while causing nitrogen gas to flow through the reactor. The temperature was thereafter raised to 120° C., at which aging was conducted for 5 hours to complete the reaction. After pouring 200 ml of toluene and 60 g of water under stirring into the reaction mixture, the resultant mixture was left over so that the mixture was allowed to separate into layers. The weight average molecular weight of a resin thus obtained was 1550. The upper solvent layer was charged into a separate glass-made reactor, followed by addition of 20 g of 28% aqueous ammonia and 8.1 g (0.1 mole) of zinc oxide. The resultant mixture was then stirred for 1 hour at room temperature. The mixture was thereafter heated to distill out the solvent. The internal temperature was raised to 150° C., at which the residue was aged for 2 hours. It was then degasified for 30 minutes in a vacuum of 20 mmHg, thereby obtaining 212 g of a zinc-modified salicylic acid resin in a clear, reddish brown form (yield: stoichiometric). Its softening point was found to be 96° C. It will be designated as Resin (A)-1.

SYNTHESIS EXAMPLE A-2

A reactor was charged with 27.6 g (0.2 mole) of salicylic acid, 123.7 g (0.8 mole) of p-methyl-α-methylbenzyl chloride, 100 ml of monochlorobenzene and as a catalyst, 5.6 g of "Nafion H" (trade name; product of E. I. du Pont de Nemours & Co., Inc.). They were reacted for 5 hours under reflux of the solvent. After the reaction, 300 ml of warm water was added and the resultant mixture was stirred for 20 minutes at temperatures of 90° C. and higher, and the upper water layer was removed. The average molecular weight of a resin thus formed was 850. The resin was added with 1500 ml of water, followed by a dropwise addition of 36 g (0.4 mole) of a 45% aqueous solution of caustic soda. The resultant mixture was heated to azeotropically distill out the solvent, whereby an aqueous solution was obtained in a somewhat turbid state. The aqueous solution was then cooled down to 40° C., to which an aqueous solution prepared in advance by dissolving 29 g (0.1 mole) of zinc sulfate heptahydrate in 200 ml of water was added dropwise. A white precipitate was formed. The precipitate was collected by filtration, washed with water and then dried in vacuum, thereby obtaining 126 g of a zinc-modified salicylic acid resin. The zinc content was found to be 5.05% by an elemental analysis. It will be designated as Resin (A)-2.

SYNTHESIS EXAMPLE A-3

Into a reactor, 27.6 g (0.2 mole) of salicylic acid, 74 g (0.4 mole) of α-methylbenzyl bromide and as a catalyst, 15.2 g of zinc chloride were charged. They were condensed at 60°-90° C. for 5 hours while causing nitrogen gas to flow through the reactor. The temperature was thereafter raised to 135° C., at which the reaction was continued for 2 hours.

The weight average molecular weight of a condensation resin thus formed was 550.

The reaction product was added with 150 ml of toluene, whereby the reaction product was dissolved. Dilute aqueous ammonia was then added dropwise at 70°-80° C. to adjust the solution to pH 6. The resultant solution was added with 8.1 g (0.1 mole) of zinc oxide and then stirred for 1 hour at 70°-80° C. to complete the reaction. After completion of the reaction, the lower water layer was drawn out. An organic layer was concentrated under heat. A molten resin was then taken out and cooled, followed by grinding to obtain 75 g of a zinc-modified salicylic acid resin as powder. The softening point of the zinc-modified resin was 110° C. It will be designated as Resin (A)-3.

SYNTHESIS EXAMPLE A-4

A reactor was charged with 6.9 g (0.05 ) of salicylic acid, 0.2 g of anhydrous zinc chloride and 10 ml of acetic acid. Thereafter, 46.1 g (0.2 mole) of p-(α-methylbenzyl)benzyl chloride was added in portions at an internal temperature of 90°-95° C. over 5 hours. After completion of the addition, the reaction mixture was heated and a reaction was conducted for 3 hours under reflux of the acetic acid. Thereafter, 6.3 g (0.025 mole) of nickel acetate was added to reaction mixture and the acetic acid was allowed to distil out while raising the temperature of the reaction mixture. When the temperature reached 150° C., the pressure was reduced to a vacuum. The residue was maintained for 1 hour at the same temperature and pressure. The softening point of a nickel-modified salicyclic acid resin was 102° C. It will be designated as Resin (A)-4.

SYNTHESIS EXAMPLE A-5

(i) Synthesis of Salicylic Acid Resin

A glass-made reactor was charged with 27.6 g (0.2 mole) of salicylic acid, 109 g (0.8 mole) of benzyl ethyl ether and as a catalyst, 1.3 g of p-toluenesulfonic acid. After condensing them at 160°-170° C. for 3 hours, the reaction mixture was heated further to 180° C. at which the reaction was continued further for 2 hours. In the course of the reaction, 34 g of ethanol was distilled out. At the same temperature, the reaction product was immediately poured into an enameled shallow pan and was then left over. The resinous reaction product was solidified, thereby obtaining 95 g of a clear, reddish brown resin. The softening point of the thus-obtained resin was 52° C.

(ii) Synthesis of Multivalent-Metal-Modified Salicyclic Acid Resin

Ten grams of the above resin were placed in a flask and were then heated and molten at 150°-160° C. A mixture of 3.3 g of zinc benzoate and 2 g of ammonium bicarbonate, which had been obtained in advance, was gradually added under stirring to the molten resin over 30 minutes. The resultant mixture was then stirred at 155°-165° C. for 1 hour to complete the reaction. After completion of the reaction, the molten resin was taken out, cooled and then ground, so that 120 g of a zinc-benzoate-modified salicylic acid resin was obtained as powder. The softening point of the zinc-modified resin was 79° C. It will be designated as Resin (A)-5.

SYNTHESIS EXAMPLE A-6

(i) Synthesis of Salicylic Acid Resin

A glass-made reactor was charged with 27.6 g (0.2 mole) of salicylic acid, 83 g (0.5 mole) of 3,5-dimethylbenzyl ethyl ether and as a catalyst, 0.75 g of anhydrous zinc chloride. After condensing them at 150°-160° C. for 4 hours, the reaction mixture was heated further to 170° C. and the reaction was continued further for 2 hours at the same temperature. The internal temperature was then cooled to 100° C. and 200 ml of toluene was added to dissolve the contents. After the dissolution, 500 ml of warm water was added, the resultant mixture was stirred for 20 minutes at 95°-100° C., and a water layer was removed. This warm-water washing and separation procedure was repeated two more times so that unreacted salicylic acid was removed. The solvent was thereafter caused to distil out, and the condensation product was cooled to obtain 68 g of a clear, reddish brown resin. Its softening point was 58° C.

(ii) Synthesis of Multivalent-Metal-Modified Salicylic Acid Resin

Ten grams of the above resin were dispersed in 100 g of water which contained 0.65 g of caustic soda. The dispersion was heated to 70° C. under stirring so as to dissolve the resin. While maintaining the temperature of the resultant solution at 45°-50° C., a solution which had been prepared in advance by dissolving 1.2 g of anhydrous zinc chloride (purity: 90%) in 30 ml of water was added dropwise under stirring over 30 minutes.

A white precipitate was formed. After continuously stirring the reaction mixture at the same temperature for 2 hours, the precipitate was collected by filtration, washed with water and then dried to obtain 9.8 g of white powder. It will be designated as Resin (A)-6.

SYNTHESIS EXAMPLE A-7

A glass-made reactor was charged with 27.6 g (0.2 mole) of salicylic acid, 54 g (0.5 mole) of benzyl alcohol and as catalysts, 0.8 g of anhydrous zinc chloride and 0.8 g of p-toluenesulfonic acid. After condensing them at 130°-140° C. for 4 hours, the reaction mixture was heated further to 160° C. and the reaction was continued further for 2 hours at the same temperature. The internal temperature was then cooled to 100° C. and 200 ml of toluene was added to dissolve the contents. After the dissolution, 500 ml of warm water was added, the resultant mixture was stirred for 20 minutes at 95°-100° C., and a water layer was removed. This warm-water washing and separation procedure was repeated two more times so that unreacted salicylic acid was removed. The solvent was thereafter caused to distil out, and the condensation product was cooled to obtain 70 g of a clear, pale reddish brown resin. Its softening point was 46° C.

(ii) Synthesis of Multivalent-Metal-Modified Salicylic Acid Resin

Ten grams of the above resin was dispersed in 100 g of water which contained 0.9 g of caustic soda. The dispersion was heated to 70° C. under stirring so as to dissolve the resin. While maintaining the temperature of the resultant solution at 45°-50° C., a solution which had been prepared in advance by dissolving 1.7 g of anhydrous zinc chloride (purity: 90%) in 30 ml of water was added dropwise under stirring over 30 minutes.

A white precipitate was formed. After continuously stirring the reaction mixture at the same temperature for 2 hours, the precipitate was collected by filtration, washed with water and then dried to obtain 10.5 g of white powder. It will be designated as Resin (A)-7.

SYNTHESIS EXAMPLE A-8

(i) Synthesis of salicylic acid resin

A glass-made reactor was charged with 27.6 g (0.2 mole) of salicylic acid, 24.4 g (0.2 mole) of α-methylbenzyl alcohol and as a catalyst, 3.0 g of p-toluenesulfonic acid. They were condensed at 150°-160° C. for 3 hours while causing nitrogen gas to flow through the reactor. Then, 48.8 g (0.4 mole) of α-methylbenzyl alcohol was added dropwise over 5 hours at the same temperature. The temperature was thereafter raised to 170°-180° C., at which aging was conducted for 3 hours. At the same temperature, the reaction product was immediately poured into an enameled shallow pan and was then left over. The resinous reaction product was solidified, thereby obtaining 86 g of a clear, pale yellow resin. The weight average molecular weight of the resin thus obtained was 750 and its softening point was 54° C.

(ii) Synthesis of Multivalent-Metal-Modified Salicylic Acid Resin

Twenty-five grams of the above resin were placed in a flask and were then heated and molten at 150°-160° C. A mixture of 6.8 g of zinc benzoate and 4 g of ammonium bicarbonate, which had been obtained in advance, was gradually added under stirring to the molten resin over 30 minutes. The resultant mixture was then stirred at 155°-165° C. for 1 hour to complete the reaction. After completion of the reaction, the molten resin was taken out, cooled and then ground, so that 27 g of a zinc-benzoate-modified salicyclic acid resin was obtained as powder. The softening point of the zinc-modified resin was 78° C. It will be designated as Resin (A)-8.

SYNTHESIS EXAMPLE A-9

A reactor was charged with 48 g (0.09 mole) of a 20 wt. % aqueous solution of sodium carbonate and 21.2 g (0.1 mole) of 2,4-dimethyl-α-methylbenzyl bromide. They was reacted at 100° C. for 20 hours. When the reaction mixture was left over after completion of the reaction, it cooled down and separated into two layers. The lower water layer was removed to obtain the upper organic layer. Yield: 14.5 g. It was found to have the following composition by gas chromatography.

| | |
|---|---|
| 2,4-Dimethyl-α-methylbenzyl alcohol | 87.5 wt. % |
| Di-(2,4-dimethyl-α-methylbenzyl) ether | 11.9 wt. % |
| Others | 0.6 wt. % |

Using the benzyl compounds, a metal-modified salicylic acid co-condensation resin was next produced in the following manner. A reactor was charged with 3.45 g (0.025 mole) of salicylic acid, 14.5 g of the above benzyl compounds and as a catalyst, 0.09 g of aluminum chloride. While causing nitrogen gas to flow through the reactor, the resultant mixture was heated. Distillation of water started at 120° C. While guiding the distilled water to the outside of the reaction system, the reaction mixture was heated further and maintained at 150° C. The reaction was conducted at the same temperature for 7 hours to complete the co-condensation reaction. After completion of the reaction, the reaction mixture was immediately taken out of the reactor to obtain 16.2 g of a co-condensation resin of salicylic acid. Its average molecular weight was 780. The co-condensation resin was then added to a solution of 1.38 g (0.013 mole) of sodium carbonate in 100 ml of water. The resultant mixture was heated to 70° C. under stirring, whereby the co-condensation resin was dissolved. The temperature of the solution was then lowered to 30° C., followed by a dropwise addition of a solution, which had been prepared in advance by dissolving 4.3 g (0.015 mole) of zinc sulfate heptahydrate in 30 ml of water, over 30 minutes. A white precipitate was formed. After continuously stirring the reaction mixture at the same temperature for 2 hours, the precipitate was collected by filtration, washed with water and then dried to obtain 16.5 g of white powder. It will be designated as Resin (A)-9.

SYNTHESIS EXAMPLE B-1

A glass-made reactor was charged with 27.6 g (0.2 mole) of salicylic acid, 48.8 g (0.4 mole) of benzyl methyl ether and as catalysts, 0.76 g of p-toluenesulfonic acid and 0.76 g of anhydrous zinc chloride. They were condensed at 125°-135° C. for 3 hours while causing nitrogen gas to flow through the reactor. The reaction temperature was thereafter raised to 145° C., at which the reaction was continued further for 2 hours. The internal temperature was cooled down to 70° C., followed by an addition of 150 ml of 1,2-dichloroethane. The resultant mixture was then cooled down to room temperature. Thereafter, 7.5 g of 96% sulfuric acid was charged and under vigorous stirring, 83.2 g (0.8 mole) of styrene was added dropwise at 20°-30° C. over 5 hours. The reaction mixture was then aged at the same temperature for 5 hours to complete the reaction. After pouring 60 g of water into the reaction mixture under stirring, the resultant mixture was left over so that the mixture was allowed to separate into layers. The average molecular weight of a resin thus obtained was 1380. The lower solvent layer was charged into a separate glass-made reactor, followed by addition of 20 g of 28% aqueous ammonia and 8.1 g (0.1 mole) of zinc oxide. The resultant mixture was then stirred for 1 hour at room temperature. The mixture was thereafter heated and a reaction was conducted at 60°-70° C. for 1 hour. The reaction mixture was then heated to distill out the solvent. The internal temperature was raised to 150° C., and the residue was then degasified for 30 minutes in a vacuum of 20 mmHg to obtain 156 g of a zinc-modified salicylic acid resin in a clear, reddish brown form (yield: stoichiometric).

The softening point of the resin was 85° C. It will be designated as Resin (B)-1.

SYNTHESIS EXAMPLE B-2

A reactor was charged with 27.6 g (0.2 mole) of salicylic acid, 40.8 g (0.3 mole) of p-methyl-α-methylbenzyl alcohol, 100 ml of monochlorobenzene and as a catalyst, 0.7 g of anhydrous zinc chloride. They were reacted for 5 hours under reflux of the solvent. In the course of the reaction, the distilled water was removed by a water separator. After the reaction, 300 ml of warm water was added and the resultant mixture was stirred for 20 minutes at 90° C. or higher, and the upper water layer was removed. This water-washing and separation procedure was repeated two more times to remove unreacted salicylic acid. Then, 10 g of concentrated sulfuric acid was poured into the monochlorobenzene solution which had been chilled to 5° C. To the resultant mixture, 31.2 g (0.3 mole) of styrene was added dropwise at 5°-10° C. over 7 hours. After the reaction, the reaction mixture was aged for 3 hours at the same temperature. The weight average molecular weight of the resin was 1150 at that time. The resin was added with 1500 ml of water, followed by a dropwise addition of 36 g (0.4 mole) of a 45% aqueous solution of caustic soda. The resultant mixture was then heated to azeotropically distil out the solvent, thereby obtaining an aqueous solution in a somewhat turbid state. The aqueous solution was cooled to 40° C., followed by a dropwise addition of an aqueous solution which had been prepared in advance by dissolving 29 g (0.1 mole) of zinc sulfate heptahydrate in 200 ml of water. A white precipitate was formed. The white precipitate was collected by filtration, washed with water and then dried in a vacuum, thereby obtaining 92 g of a zinc-modified salicylic acid resin. Its zinc content was found to be 6.78% by an elemental analysis. It will be designated as Resin (B)-2.

SYNTHESIS EXAMPLE B-3

A zinc-modified salicylic acid co-condensation resin (172 g) of a pale reddish brown color was obtained in the same manner as in Synthesis Example B-1 except that benzyl methyl ether was replaced by the same amount (0.4 mole) of benzyl alcohol and 104 g (1.0 mole) of styrene was used instead of 83.2 g (0.8 mole) of styrene. The softening point of the resin was 58° C. It will be designated as Resin (B)-3.

SYNTHESIS EXAMPLE C-1

(i) Synthesis of Salicylic Acid Resin

A glass-made reactor was charged with 6.9 g (0.02 mole) of 3,5-di(4-methylbenzyl)salicylic acid, 50 ml of isopropyl ether and as a catalyst, 2.7 g of anhydrous aluminum chloride. The resultant mixture was maintained at 50° C. under stirring. At the same temperature, 7.6 g (0.06 mole) of benzyl chloride was added dropwise over 8 hours to conduct a reaction. After completion of the dropwise addition, the reaction mixture was aged for 2 hours at the same temperature and was then poured into a dilute aqueous solution of hydrochloric acid. The resultant mixture was allowed to separate into layers. The solvent was then distilled out to obtain 12.0 g of a reddish brown resin. The weight average molecular weight of the thus-obtained resin was 1250, while its softening point was 65° C.

(ii) Synthesis of Multivalent-Metal-Modified Salicylic Acid Resin

Ten grams of the resin obtained in the above step (i) and 0.65 g of caustic soda were stirred and dissolved in 200 ml of hot water. While maintaining the temperature of the resultant solution at 30°-35° C., a solution which had beforehand been prepared by dissolving 2.5 g of zinc sulfate heptahydrate in 30 ml of water was added dropwise over 30 minutes. A white precipitate was formed. After continuously stirring the mixture for 2 hours at the same temperature, the precipitate was collected by filtration, washed with water and then dried to obtain 10.5 g of white powder (yield: stoichiometric). The powder was a zinc-modified salicylic acid resin. As a result of an analysis of its zinc content, the zinc content was found to be 4.96%. The resin will be designated as Resin (C)-1.

SYNTHESIS EXAMPLE C-2

(i) Synthesis of Salicylic Acid Resin

A glass-made reactor was charged with 5.1 g (0.02 mole) of 5-(α, α-dimethylbenzyl)salicylic acid, 50 ml of nitromethane, and as a catalyst, 1.4 g of anhydrous zinc chloride. The resultant mixture was maintained at 95° C. under stirring. At the same temperature, 22.5 g (0.16 mole) of p-methylbenzyl chloride was added dropwise over 10 hours to conduct a reaction. After completion of the dropwise addition, the reaction mixture was aged for 2 hours at the same temperature to complete the reaction. The weight average molecular weight of the thus-obtained resin was 2400.

(ii) Synthesis of Multivalent-Metal-Modified Salicylic Acid Resin

The reaction product obtained in the above step (i) was added with and dissolved in 75 ml of toluene. Dilute aqueous ammonia was then added dropwise at 70°-80° C. to adjust the pH to 6. Thereafter, the resultant mixture was added with 0.81 g (0.01 mole) of zinc oxide and then stirred at 70°-80° C. for 1 hour to complete the reaction. After completion of the reaction, the lower water layer was drawn out and the organic layer was concentrated under heat. The resultant molten resin was taken out, cooled and then ground, thereby obtaining 23 g of a zinc-modified salicylic acid resin as powder. The softening point of the zinc-modified resin was 86° C. It will be designated as Resin (C)-2.

SYNTHESIS EXAMPLE C-3

(i) Synthesis of Salicyclic Acid Resin

A glass-made reactor was charged with 5.4 g (0.02 mole) of 3-tert-butyl-5-phenylsalicylic acid, 30 ml of glacial acetic acid, and as a catalyst, 1.4 g of anhydrous zinc chloride. The resultant mixture was heated under stirring and maintained under reflux. Then, 12.4 g (0.08 mole) of 2,4-dimethylbenzyl chloride was added dropwise over 6 hours to conduct a reaction. After completion of the dropwise addition, the reaction mixture was aged for 2 hours under reflux to complete the reaction. The weight average molecular weight of the thus-obtained resin was 1680.

(ii) Synthesis of Multivalent-Metal-Modified Salicylic Acid Resin

Following the procedure of Synthesis Example C-2, 15 g of a zinc-modified salicylic acid resin was obtained as powder from the reaction product obtained in the above step (i). The softening point of the zinc-modified resin was 94° C. It will be designated as Resin (C)-3.

SYNTHESIS EXAMPLE C-4

(i) Synthesis of Salicylic Acid Resin

Charged were 5.50 g (0.02 mole) of 1-hydroxy-2-carboxy-4-benzylnaphthalene, 50 ml of 1,2-dichloroethane, and as a catalyst, 2.7 g of anhydrous aluminum chloride. The resultant mixture was maintained at 70° C. under stirring. Then, 5.2 g (0.03 mole) of benzyl bromide was added dropwise over 6 hours to conduct a reaction. After completion of the dropwise addition, the reaction mixture was aged for 2 hours at the same temperature and then poured into dilute hydrochloric acid. The resultant mixture was allowed to separate into layers. The lower organic layer was concentrated to obtain 8.2 g of a reddish brown resin. The weight average molecular weight of the resin was 720.

(ii) Synthesis of Multivalent-Metal-Modified Salicylic Acid Resin

To the resin obtained in the above step (i), a mixture of 3.2 g (0.01 mole) of zinc benzoate and 2.4 g (0.03 mole) of ammonium bicarbonate was slowly added at 150°-160° C. The resultant mixture was then stirred for 1 hour at 155°-165° C. to complete the reaction. After completion of the reaction, the resultant molten resin was taken out, cooled and ground to obtain 23 g of a zinc-benzoate-modified salicylic acid resin as powder. The softening point of the zinc-modified resin was 108° C. It will be designated as Resin (C)-4.

EXAMPLE A-1

Twenty-five grams of a 20% aqueous solution of polyvinyl alcohol containing 5 mole % of sodium 2-acrylamido-2-methylpropanesulfonate (average polymerization degree: 300, saponification degree: 90%) and 135.7 g of water were mixed in advance, and the pH of the resultant aqueous solution was adjusted to 8.0. Into the thus-prepared aqueous solution, 100 g of fine powder of Resin (A)-1 obtained in Synthesis Example A-1 was added. After stirring the resultant mixture into a slurry, it was processed for 3 hours in a sand grinder which contained as a grinding medium glass beads having a diameter of 1 mm, thereby obtaining a white aqueous suspension (solids: 40 wt. %) whose average particle size was 2.4 μm.

EXAMPLE A-2

An ethylene-sulfonic acid-vinyl acetate copolymer containing 3 mole % ethylenesulfonic acid was saponified with caustic soda, thereby obtaining polyvinyl alcohol (average polymerization degree: 300) which contained sulfonic acid groups in a proportion equivalent to 3 mole % along with 1 mole % of acetyl groups.

Into an aqueous solution (pH 8.4) which had been obtained in advance by mixing 50 g of a 20% aqueous solution of the polyvinyl alcohol containing sulfonic acid groups with 90 g of water, 100 g of Resin (A)-2 obtained in Synthesis Example A-2 was added. After stirring the resultant mixture into a slurry, it was dispersed for 5 hours under water cooling in an attritor (manufactured by Mitsui Miike Engineering Corporation; contained zirconium media of 5 mm diameter) so that a white aqueous suspension (solids: 45 wt. %, average particle size: 2.3 μm) was obtained.

EXAMPLE A-3

Sulfonated polyvinyl alcohol was obtained by adding polyvinyl alcohol to 80% sulfuric acid (maintained at 0° C.), reacting them to each other, neutralizing the reaction product and then purifying the thus-neutralized reaction product. The sulfonated polyvinyl alcohol contained sulfonic acid groups in a proportion equivalent to 5 mole % of the whole monomer units along with 10 mole % of acetyl groups. An aqueous solution obtained in advance by mixing 85 g of water with 25 g of a 20% aqueous solution of the sulfonated polyvinyl alcohol was heated to 90° C, followed by an addition of 100 g of Resin (A)-3 obtained in Synthesis Example A-3. After emulsifying and dispersing the resultant mixture at a high speed by a homomixer (manufactured by Tokushu Kika Kogyo Co., Ltd.), the mixture was cooled down to room temperature so that a white aqueous suspension containing 50 wt. % of solids (average particle size: 2.1 μm) was obtained.

EXAMPLE A-4

Into an aqueous solution obtained by mixing 15 g of a 20% aqueous solution of polyvinyl alcohol containing 5 mole % of ethylenesulfonic acid (average polymerization degree: 250, saponification degree: 88%) and 6.7 g of a 30% aqueous solution of sodium salt of sulfonated polystyrene with 140.8 g of water, 100 g of fine powder of Resin (A)-4 obtained in Synthesis Example A-4 was added. After stirring the resultant mixture into a slurry, the slurry was processed for 2 hours in a sand mill which contained as a grinding medium glass beads having a diameter of 1 mm, thereby obtaining a white aqueous suspension (solid content: 40 wt. %, average particle size: 2.4 μm).

EXAMPLE A-5

Into an aqueous solution which had been prepared by mixing 25 g of a 20% aqueous solution of the sodium salt of sulfated polystyrene (molecular weight: 10000, sulfonation degree: 70%) with 135.7 g of water and then adjusting its pH to 8.0, 100 g of fine powder of Resin (A)-1 obtained in Synthesis Example A-1 was added. In the same manner as in Example A-1, a white aqueous suspension having an average particle size of 2.1 μm (solid content: 40 wt. %) was obtained.

EXAMPLE A-6

Into a mixture (adjusted to pH 8.5 with dilute aqueous ammonia) of 30 g of a 30% aqueous solution of the $NH_4$ salt of sulfonated polystyrene ("Chemistat 65000", trade name; product of Sanyo Chemical Industries, Ltd.) and 88 g of water, 100 g of fine powder of Resin (A)-2 obtained in Synthesis Example A-2 was added. After stirring the resultant mixture into a slurry, the slurry was dispersed in the same manner as in Example A-2 so that a white aqueous suspension (solid content: 45 wt. %, average particle size: 1.9 μm) was obtained.

EXAMPLE A-7

Into an aqueous solution which had been obtained by mixing 10 g of a 20% aqueous solution of polyvinyl alcohol containing 5 mole % of ethylenesulfonic acid (average polymerization degree: 250, saponification degree: 88%) and 5 g of a 30% aqueous solution of poly(sodium styrenesulfonate) ("OKS-3376", trade name; product of The Nippon Synthetic Chemical Industry Co., Ltd.) with 112.1 g of water, 100 g of fine powder of Resin (A)-3 obtained in Synthesis Example A-3 was added. The resultant mixture was processed for 1.5 hours in a sealed sand grinder (Dyno mill) which contained as a grinding medium glass beads having a diameter of 0.8 mm, thereby obtaining a white aqueous suspension having an average particle size of 2.4 μm (solid content: 48 wt. %).

EXAMPLE A-8

Into an aqueous solution which had been obtained by mixing 13.3 g of a 30% aqueous solution of the sodium salt of a sulfonated styrene-maleic acid copolymer ("S-SMA-1000", trade name; product of Arco Chemical Company) with 117.8 g of water, 100 g of Resin (A)-4 obtained in Synthesis Example A-4 was added. The resultant mixture was processed for 2 hours in a horizontal sand mill which contained as a grinding medium glass beads having a diameter of 1.0 mm, thereby obtaining a white aqueous suspension having an average particle size of 2.3 μm (solid content: 45 wt. %).

EXAMPLE A-9

A white aqueous suspension having an average particle size of 2.5 μm (solid content: 40 wt. %) was obtained in the same manner as in Example A-1 except for the use of Resin (A)-5 in lieu of Resin (A)-1.

EXAMPLE A-10

A white aqueous suspension (solid content: 45 wt. %, average particle size: 2.4 μm) was obtained in the same manner as in Example A-2 except for the use of Resin (A)-6 in lieu of Resin (A)-2.

EXAMPLE A-11

A white aqueous suspension having an average particle size of 2.5 μm (solid content: 40 wt. %) was obtained by conducting stirring and slurry formation in the same manner as in Example A-3 except for the use of Resin (A)-2 instead of Resin (A)-3 and then effecting dispersing processing in the same manner as in Example A-1.

EXAMPLE A-12

A white aqueous suspension having an average particle size of 2.1 μm (solid content: 50 wt. %) was obtained in the same manner as in Example A-3 except for the use of Resin (A)-9 in place of Resin (A)-3.

EXAMPLE A-13

A white aqueous suspension (solid content: 40 wt. %, average particle size: 2.1 μm) was obtained in the same manner as in Example A-5 except for the use of Resin (A)-7 in place of Resin (A)-1.

EXAMPLE A-14

A white aqueous suspension (solid content: 45 wt. %, average particle size: 1.9 μm) was obtained in the same manner as in Example A-6 except for the use of Resin (A)-8 in lieu of Resin (A)-2.

EXAMPLE A-15

A white aqueous suspension having an average particle size of 2.1 μm (solid content: 45 wt. %) was obtained in the same manner as in Example A-8 except for the use of Resin (A)-1 in place of Resin (A)-4.

EXAMPLE A-16

A white aqueous suspension having an average particle size of 2.1 μm (solid content: 40 wt. %) was obtained by conducting stirring and slurry formation in the same manner as in Example A-4 except for the use of Resin (A)-8 instead of Resin (A)-4 and then effecting dispersing processing in the same manner as in Example A-1.

EXAMPLE A-17

Into an aqueous solution which had been obtained by mixing 20 g of a 20% aqueous solution of polyvinyl alcohol (average polymerization degree: 300, saponification degree: 90%) containing 5 mole % of sodium 2-acrylamide-2-methylpropanesulfanate units and 3.3 g of a 30% aqueous solution of the sodium salt of a sulfonated styrene condensation resin ("NARLEX-D82", trade name; product of Kanebo-NSC, Ltd.) with 157 g of water, 100 g of Resin (A)-5 obtained in Synthesis Example A-5 was added. After the resultant mixture was stirred into a slurry, the slurry was processed for 2 hours in the horizontal sand mill employed in Example A-8, thereby obtaining a white aqueous suspension having an average particle size of 2.2 μm (solid content: 40 wt. %).

EXAMPLE A-18

A white aqueous suspension having an average particle size of 2.2 μm (solid content: 48 wt. %) was obtained in the same manner as in Example A-7 except for the use of Resin (A)-9 in place of Resin (A)-3.

EXAMPLE A-19

Into an aqueous solution which had been obtained by mixing 12 g of a 20% aqueous solution of sulfonated polyvinyl alcohol (which contained sulfonic acid groups in a proportion equivalent to 5 mole % of the whole monomer units along with 10 mole % of acetyl groups) and 10 g of a 30% aqueous solution of the sodium salt of a styrene-maleic acid copolymer with 114 g of water, 100 g of Resin (A)-2 obtained in Synthesis Example A-2 was added. After stirring the resultant mixture into a slurry, it was dispersed for 5 hours under water cooling in the attritor employed in Example A-2 so that a white aqueous suspension (solid content: 45 wt. %, average particle size: 2.6 μm) was obtained.

EXAMPLE A-20

Fine powder (100 g) of Resin (A)-7 was added to an aqueous solution (pH 8.4) which had been prepared in advance by mixing 50 g of a 20% aqueous solution of acrylamide-modified polyvinyl alcohol (average polymerization degree: 1000, the degree of modification: 10 mole %; "PC-100", trade name; product of Denki Kagaku Kogyo Kabushiki Kaisha) with 90 g of water. After stirring the resultant mixture into a slurry, the slurry was dispersed for 5 hours under water cooling in the attritor employed in Example A-2. A white aqueous suspension (solid content: 45 wt. %, average particle size: 2.3 μm) was obtained.

EXAMPLE A-21

Resin (A)-8 (100 g) was added to an aqueous solution which had been obtained by mixing 20 g of a 20% aqueous solution of acrylamide-modified polyvinyl alcohol (average polymerization degree: 1000 the degree of modification: 10 mole %) and 5 g of a 30% aqueous solution of poly(sodium styrenesulfonate) (molecular weight: 5000, sulfonation degree:90%) with 139 g of water. After stirring the resultant mixture into a slurry, a white aqueous suspension having an average particle size of 2.2 μm (solid content: 40 wt. %) was obtained in the same manner as in Example A-2.

COMPARATIVE EXAMPLE A-1

A brown aqueous suspension having an average particle size of 2.8 μm was obtained in the same manner as in Example A-1 except that instead of the polyvinyl alcohol containing sulfonic acid groups, the sodium salt of a formaldehyde condensation product of naphthalenesulfonic acid was used in the same amount.

COMPARATIVE EXAMPLE A-2:

Formation of an aqueous suspension was conducted in the same manner as in Example A-1 except that instead of the polyvinyl alcohol containing sulfonic acid groups, completely-saponified polyvinyl alcohol ("POVAL 117", trade name; product of Kuraray Co., Ltd.) was used in the same amount. Considerable foaming took place upon stirring the mixture into a slurry prior to the processing of the slurry in the sand grinder and during the processing in the sand grinder. Even after the processing, it took 24 hours until foams disappeared. The work efficiency was hence extremely inferior. The thus-formed aqueous suspension was a viscous white aqueous suspension having an average particle size of 2.6 μm.

COMPARATIVE EXAMPLE A-3

Fine powder (100 g) of Resin (A)-2 obtained in Synthesis Example A-2 was dispersed in 120 g of water in which 10 g of sodium ligninsulfonate ("Orzan CD", trade name; product of ITT Rayonier Company) had been dissolved, thereby forming a slurry. The slurry was then processed in a sand grinder in the same manner as in Example A-1, so that a brown aqueous suspension (solid content: 47.8 wt. %, average particle size: 2.5 μm) was obtained.

COMPARATIVE EXAMPLE A-4

A brown aqueous suspension having an average particle size of 2.8 μm was obtained in the same manner as in Comparative Example A-1 except for the substitution of Resin (A)-5 for Resin (A)-1 used in Comparative Example A-1.

COMPARATIVE EXAMPLE A-5

Formation of an aqueous suspension was conducted in the same manner as in Comparative Example A-2 except for the replacement of Resin (A)-1 employed in Comparative Example A-2 to Resin (A)-5. Considerable foaming took place upon stirring the mixture into a slurry prior to the processing of the slurry in the sand grinder and during the processing in the sand grinder. Even after the processing, it took 24 hours until foams disappeared. The work efficiency was hence extremely inferior. The thus-formed aqueous suspension was a viscous white aqueous suspension having an average particle size of 2.6 μm.

COMPARATIVE EXAMPLE A-6

A brown aqueous suspension (solid content: 47.8 wt. %, average particle size: 2.5 μm) was obtained in the same manner as in Comparative Example A-3 except for the use of Resin (A)-6 instead of Resin (A)-2.

COMPARATIVE EXAMPLE A-7

When processing was conducted in the same manner as in Comparative Example A-5 except that the sodium salt of a polycarboxylic acid ("Quinflow 540", trade name for the sodium salt of a copolymer of $C_5$ fraction and maleic anhydride; product of Nippon Zeon Co., Ltd.) was used in the same amount instead of the polyvinyl alcohol containing sulfonic acid groups, the state of dispersion was poor and the resultant mixture turned to a solid paste as a whole. It was hence unable to take it out as an aqueous suspension.

COMPARATIVE EXAMPLE A-8

Into a glass-made reactor, were charged 170 g of p-phenylphenol, 22.5 g of 80% paraformaldehyde, 2.0 g of p-toluenesulfonic acid and 200 g of benzene. While heating them under stirring and distilling the resulting water out of the system azeotropically with the benzene, they were reacted for 2 hours at 70°-80° C. After the reaction, 320 g of a 10% aqueous solution of sodium hydroxide was added and the benzene was distilled out by steam distillation. The resultant mixture was cooled, followed by a dropwise addition of dilute sulfuric acid. A p-phenylphenol-formaldehyde polymer thus precipitated was collected by filtration, washed with water, and then dried, thereby obtaining 176 g of white powder.

In an aqueous solution of 12 g of a 25% aqueous solution of the sodium salt of a polycarboxylic acid ("Polystar OM", trade name; product of Nippon Oil & Fats Co., Ltd.) in 160 g of water, 100 g of powder of the p-phenylphenol-formaldehyde polymer was dispersed to form a slurry. The slurry was processed in a sand grinder in the same manner as in Example A-1, thereby obtaining a white aqueous suspension (solid content: 39.6 wt. %, average particle size: 25 μm).

Properties of the aqueous suspensions obtained separately in Examples A-1–A-21 and Comparative Examples A-1–A-8 were evaluated. Results are summarized in Table 1.

TABLE 1

| | Ex. A-1 | Ex. A-2 | Ex. A-3 | Ex. A-4 | Ex. A-5 | Ex. A-6 | Ex. A-7 | Ex. A-8 | Ex. A-9 | Ex. A-10 |
|---|---|---|---|---|---|---|---|---|---|---|
| | Properties of aqueous suspension | | | | | | | | | |
| Hue reflectivity (%) | 83.1 | 83.1 | 83.2 | 82.9 | 83.1 | 82.9 | 83.1 | 83.1 | 83.2 | 83.1 |
| Viscosity (cps) | 16.8 | 19.4 | 17.2 | 18.5 | 16.0 | 21.5 | 23.2 | 19.0 | 17.7 | 19.3 |
| High temperature storage stability | | | | | | | | | | |
| Filtration time (sec) | 26 | 29 | 30 | 21 | 29 | 33 | 31 | 19 | 31 | 29 |
| Particle size change (μm) | | | | | | | | | | |
| Before test | 2.4 | 2.3 | 2.1 | 2.4 | 2.1 | 1.9 | 2.4 | 2.3 | 2.5 | 2.4 |
| After test | 2.4 | 2.3 | 2.1 | 2.5 | 2.1 | 2.0 | 2.4 | 2.4 | 2.5 | 2.4 |
| | Properties of aqueous coating formulation | | | | | | | | | |
| Viscosity (cps) | 460 | 480 | 470 | 480 | 490 | 480 | 490 | 500 | 470 | 490 |
| Amount of agglomerates formed * (%) | 0.01 | 0.01 | 0.02 | 0.003 | 0.01 | 0.005 | 0.01 | 0.004 | 0.01 | 0.01 |
| | Properties as pressure-sensitive copying paper | | | | | | | | | |
| Color producing ability | | | | | | | | | | |
| Color production rate (%) | | | | | | | | | | |
| Initial ($J_1$) | 42.9 | 43.5 | 44.1 | 43.5 | 43.0 | 43.3 | 42.8 | 44.1 | 43.3 | 43.3 |
| Final ($J_2$) | 47.5 | 47.4 | 47.6 | 47.5 | 47.6 | 47.1 | 47.8 | 48.0 | 48.3 | 48.5 |
| Whiteness of color developing sheet (F) | 82.1 | 82.0 | 82.0 | 82.1 | 82.1 | 82.0 | 81.9 | 82.1 | 82.1 | 82.1 |
| Light yellowing resistance (ΔK) | 5.1 | 4.9 | 5.0 | 5.0 | 3.9 | 4.5 | 4.7 | 4.1 | 2.1 | 2.2 |
| NOx yellowing resistance (ΔL) | 2.5 | 2.4 | 2.4 | 2.3 | 2.7 | 2.5 | 2.7 | 2.4 | 2.5 | 2.5 |

| | Ex. A-11 | Ex. A-12 | Ex. A-13 | Ex. A-14 | Ex. A-15 | Ex. A-16 | Ex. A-17 | Ex. A-18 | Ex. A-19 | Ex. A-20 |
|---|---|---|---|---|---|---|---|---|---|---|
| | Properties of aqueous suspension | | | | | | | | | |
| Hue reflectivity (%) | 83.1 | 83.0 | 83.1 | 83.0 | 83.2 | 83.0 | 83.1 | 83.1 | 83.1 | 83.1 |
| Viscosity (cps) | 18.4 | 19.7 | 18.7 | 18.2 | 18.7 | 17.1 | 17.5 | 18.5 | 18.1 | 19.5 |
| High temperature storage stability | | | | | | | | | | |
| Filtration time (sec) | 30 | 27 | 25 | 22 | 26 | 25 | 23 | 23 | 20 | 28 |
| Particle size change (μm) | | | | | | | | | | |
| Before test | 2.5 | 2.1 | 2.0 | 1.9 | 2.3 | 2.1 | 2.2 | 2.1 | 2.3 | 2.3 |
| After test | 2.6 | 2.1 | 2.1 | 2.0 | 2.3 | 2.1 | 2.2 | 2.2 | 2.3 | 2.3 |
| | Properties of aqueous coating formulation | | | | | | | | | |
| Viscosity (cps) | 480 | 530 | 480 | 520 | 510 | 490 | 490 | 550 | 520 | 530 |
| Amount of agglomerates formed * (%) | 0.01 | 0.02 | 0.02 | 0.01 | 0.01 | 0.01 | 0.01 | 0.005 | 0.005 | 0.01 |
| | Properties as pressure-sensitive copying paper | | | | | | | | | |
| Color producing ability | | | | | | | | | | |
| Color production rate (%) | | | | | | | | | | |
| Initial ($J_1$) | 43.3 | 43.0 | 43.1 | 43.0 | 42.9 | 43.0 | 43.0 | 43.1 | 43.0 | 43.1 |
| Final ($J_2$) | 48.1 | 47.9 | 48.0 | 48.0 | 47.8 | 48.0 | 48.1 | 48.3 | 48.0 | 48.0 |
| Whiteness of color developing sheet (F) | 82.1 | 82.1 | 82.0 | 82.2 | 82.2 | 82.1 | 82.1 | 82.2 | 82.1 | 82.0 |
| Light yellowing resistance (ΔK) | 2.2 | 2.1 | 2.1 | 2.2 | 2.2 | 2.2 | 2.2 | 2.1 | 2.2 | 2.1 |
| NOx yellowing resistance (ΔL) | 2.7 | 2.7 | 2.7 | 2.5 | 2.7 | 2.6 | 2.4 | 2.4 | 2.4 | 2.7 |

| | Ex. A-21 | Comp. Ex. A-1 | Comp. Ex. A-2 | Comp. Ex. A-3 | Comp. Ex. A-4 | Comp. Ex. A-5 | Comp. Ex. A-6 | Comp. Ex. A-7 | Comp. Ex. A-8 |
|---|---|---|---|---|---|---|---|---|---|

TABLE 1-continued

| | | | | | | | | | |
|---|---|---|---|---|---|---|---|---|---|
| | Properties of aqueous suspension | | | | | | | | |
| Hue reflectivity (%) | 83.0 | 75.8 | 83.0 | 60.0 | 73.1 | 83.1 | 60.8 | — | 80.7 |
| Viscosity (cps) | 18.5 | 65.0 | 110.0 | 73.0 | 65.0 | 125.0 | 78.0 | — | 24.0 |
| High temperature storage stability | | | | | | | | | |
| Filtration time (sec) | 24 | 230 | 75 | 480 | 250 | 90 | 420 | — | 52 |
| Particle size change (μm) | | | | | | | | | |
| Before test | 2.2 | 2.6 | 2.7 | 2.5 | 2.8 | 2.6 | 2.5 | — | 2.5 |
| After test | 2.3 | 7.3 | 2.8 | 3.1 | 5.8 | 2.7 | 3.3 | — | 2.7 |
| | Properties of aqueous coating formulation | | | | | | | | |
| Viscosity (cps) | 490 | 610 | (viscous) 1720 | 720 | 720 | (viscous) 1820 | 700 | — | 490 |
| Amount of agglomerates formed * (%) | 0.01 | 1.80 | 0.06 | 0.52 | 1.30 | 0.05 | 0.64 | — | 0.02 |
| | Properties as pressure-sensitive copying paper | | | | | | | | |
| Color producing ability | | | | | | | | | |
| Color production rate (%) | | | | | | | | | |
| Initial ($J_1$) | 43.0 | 40.1 | 43.8 | 36.8 | 40.5 | 43.1 | 36.8 | — | 39.4 |
| Final ($J_2$) | 48.0 | 46.7 | 47.4 | 43.4 | 46.2 | 47.5 | 43.1 | — | 44.8 |
| Whiteness of color developing sheet (F) | 82.2 | 76.8 | 82.0 | 75.3 | 76.2 | 82.1 | 74.8 | — | 81.9 |
| Light yellowing resistance (ΔK) | 2.2 | 16.8 | 5.0 | 11.0 | 11.8 | 2.1 | 8.6 | — | 16.5 |
| NOx yellowing resistance (ΔL) | 2.5 | 11.5 | 2.6 | 19.7 | 11.4 | 2.6 | 18.4 | — | 36.2 |

* (measured by marron mechanical stability testing machine.)

EXAMPLE B-1

Fine powder (100 g) of Resin (B)-1 obtained in Synthesis Example B-1 was added to an aqueous solution which had been prepared in advance by mixing 25 g of a 20% aqueous solution of poly(sodium styrenesulfonate) (molecular weight: 5000, sulfonation degree: 65%) with 137.5 g of water and then adjusting its pH to 8.0. The resultant mixture was stirred into a slurry, followed by processing for 3 hours in a sand grinder which contained as a grinding medium glass beads having a diameter of 1 mm. A white aqueous suspension (solid content: 40 wt. %) having an average particle size of 2.5 μm was obtained.

EXAMPLE B-2

A white aqueous suspension (solid content: 50 wt. %, average particle size: 2.4 μm) was obtained in the same manner as in Example A-6 except for the use of Resin (B)-2 in place of Resin (A)-2.

EXAMPLE B-3

Fine powder (100 g) of Resin (B)-2 obtained in Synthesis Example B-2 was added to an aqueous solution of 5 g of the sodium salt of a sulfonated styrenemaleic anhydride copolymer ("S-SMA 3000", trade name; product of Arco Chemical Company) in 130 g of water. The resultant mixture was then converted into a slurry. The slurry was then processed in a sand grinder in the same manner as in Example B-1 to obtain a white aqueous suspension,(solid content: 44.7 wt. %, average particle size: 3.4 μm).

EXAMPLE B-4

A white aqueous suspension (solid content: 50 wt. %, average particle size 2.7 μm) was obtained in the same manner as in Example B-3 except for the use of the sodium salt of a sulfonated styrene condensation resin ("NARLEX-D82", trade name; product of Kanebo-NSC, Ltd.) in place of the sodium salt of the sulfonated styrene-maleic anhydride copolymer.

EXAMPLE B-5

Fine powder (100 g) of Resin (B)-1 obtained in Synthesis Example B-1 was added to an aqueous solution which had been prepared in advance by mixing 50 g of a 20% aqueous solution of polyvinyl alcohol containing 5 mole % of ethylenesulfonic acid (average polymerization degree: 250. saponification degree: 88%) with 135 g of water. The resultant mixture was stirred into a slurry, followed by dispersion in the same manner as in Example B-1 A white aqueous suspension (solid content: 40wt. %) having an average particle size of 2 3 μm was obtained.

EXAMPLE B-6

Resin (B)-2 (100 g) was added to an aqueous solution which had been obtained by mixing 13.3 g of a 30% aqueous solution of the sodium salt of a sulfonated styrene condensation resin ("NARLEX-D82", trade name; product of Kanebo-NSC, Ltd.) with 117.8 g of water. The resultant mixture was processed for 2 hours in a horizontal sand mill in which glass beads having a diameter of 1.0 mm were contained as a grinding medium, so that a white aqueous suspension (solid content: 50 wt. %) having an average particle size of 2.5 μm was obtained.

EXAMPLE B-7

Fine powder (100 g) of Resin (B)-1 obtained in Synthesis Example B-1 was added to an aqueous solution which had been prepared by mixing 20 g of a 20% aqueous solution of polyvinyl alcohol containing 5 mole % of ethylenesulfonic acid (average polymerization degree: 250, saponification degree: 88%) and 3.3 g of a 30% aqueous solution of poly(ammonium styrenesulfonate) with 110 g of water. The resultant mixture was processed for 1.5 hours in a sealed sand grinder (Dynomill) which contained as a grinding medium glass beads having a diameter of 0.8 mm. A white aqueous suspension (solid content: 45 wt. %) having an average particle size of 2.0 μm was obtained.

EXAMPLE B-8

A white aqueous suspension (solid content: 40 wt. %, average particle size: 2.6 μm) was obtained in the same manner as in Example A-1 except for the use of Resin (B)-1 in place of Resin (A)-1.

EXAMPLE B-9

A white aqueous suspension (solid content: 45 wt. %, average particle size: 2.6 μm) was obtained in the same manner as in Example A-2 except for the use of Resin (B)-2 in place of Resin (A)-2.

EXAMPLE B-10

A white aqueous suspension having a solid content of 50 wt. % (average particle size: 2.1 μm) was obtained in the same manner as in Example A-3 except for the use of Resin (B)-3 in place of Resin (A)-3.

EXAMPLE B-11

Fine powder (100 g) of Resin (B)-1 obtained in Synthesis Example B-1 was added to an aqueous solution which had been prepared by mixing 25 g of a 20% aqueous solution of polyvinyl alcohol containing 5 mole % of ethylenesulfonic acid (average polymerization degree: 250, saponification degree: 88%) and 10 g of a 30% aqueous solution of poly(sodium styrenesulfonate) with 135 g of water. After stirring the resultant mixture into a slurry, the slurry was processed for 2 hours in a same mill which contained as a grinding medium glass beads having a diameter of 1 mm. A white aqueous suspension (solid content: 40 wt. %, average particle size: 2.2 μm) was obtained.

EXAMPLE B-12

A white aqueous suspension having an average particle size of 2.6μ(solid content: 40 wt. %) was obtained in the same manner as in Example B-1 except for the use of acrylamide-modified polyvinyl alcohol (average polymerization degree: 1000, the degree of modification: 10 mole %; "PC-100", trade name; product of Denki Kagaku Kogyo Kabushiki Kaisha) in place of the poly(-sodium styrenesulfonate).

EXAMPLE B-13

Fine powder (100 g) of Resin (B)-2 was added to an aqueous solution (pH 8.4) which had been prepared in advance by mixing 50 g of a 20% aqueous solution of acrylamide-modified polyvinyl alcohol (average polymerization degree: 600, the degree of modification: 4 mole %; "NP-10K", trade name; product of Denki Kagaku Kogyo Kabushiki Kaisha) with 90 g of water. After stirring the resultant mixture into a slurry, the slurry was dispersed for 5 hours under water cooling in the attritor employed in Example A-2. A white aqueous suspension (solid content: 45 wt. %, average particle size: 2.6 μm) was obtained.

EXAMPLE B-14

A white aqueous suspension having a solid content of 50 wt. % (average particle size: 2.1 μm) was obtained in the same manner as in Example B-10 except for the use of acrylamide-modified polyvinyl alcohol (polymerization degree: 600, the degree of modification: 2 mole %; "NP-15", trade name; product of Denki Kagaku Kogyo Kabushiki Kaisha) in place of the sulfonated polyvinyl alcohol.

EXAMPLE B-15

A white aqueous suspension (solid content: 40 wt. %, average particle size: 2.2 μm) was obtained in the same manner as in Example B-11 except for the use of acrylamide-modified polyvinyl alcohol (average polymerization degree: 1000, the degree of modification: 2 mole %) in lieu of the polyvinyl alcohol containing sulfonic acid.

EXAMPLE B-16

A white aqueous suspension having an average particle size of 2.1 μm (solid content: 40 wt. %) was obtained in the same manner as in Example A-17 except for the use of Resin (B)-2 in lieu of Resin (A)-5.

EXAMPLE B-17

Resin (B)-2 (100 g) was added to an aqueous solution which had been obtained by mixing 20 g of a 20% aqueous solution of acrylamide-modified polyvinyl alcohol (average polymerization degree: 1000, the degree of modification: 10 mole %) and 5 g of a 30% aqueous solution of poly(sodium styrenesulfonate) (molecular weight: 5000, sulfonation degree: 90%) with 139 g of water. After stirring the resultant mixture into a slurry, a white aqueous suspension having an average particle size of 2.1 μm (solid content: 40 wt. %) was obtained in the same manner as in Example A-2.

EXAMPLE B-18

A white aqueous suspension having an average particle size of 2.3 μm (solid content: 40 wt. %) was obtained in the same manner as in Example B-16 except for the use of acrylamide-modified polyvinyl alcohol (average polymerization degree: 600, the degree of modification: 2 mole %) instead of the acrylamide-modified polyvinyl alcohol (average polymerization degree: 1000, the degree of modification: 10 mole %).

EXAMPLE B-19

Resin (B)-3 (100 g) was added to an aqueous solution which had been obtained by mixing 20 g of a 20% aqueous solution of polyvinyl alcohol containing 3 mole % of ethylenesulfonic acid (average polymerization degree: 300, saponification degree: 88%) and 5 g of a 30% aqueous solution of poly(sodium styrenesulfonate) (molecular weight: 10000, sulfonation degree: 94%) with 139 g of water. After stirring the resultant mixture into a slurry, a white aqueous suspension having an average particle size of 2.1 μm (solid content: 40 wt. %) was obtained in the same manner as in Example B-1.

EXAMPLE B-20

Resin (B)-2 (100 g) obtained in Synthesis Example B-2 was added to an aqueous solution which had been obtained by mixing 20 g of a 20% aqueous solution of sulfonated polyvinyl alcohol (which contained sulfonic acid groups in a proportion equivalent to 5 mole % of the whole monomer units along with 10 mole % of acetyl groups) and 5 g of a 30% aqueous solution of poly(sodium styrenesulfonate) (molecular weight: 5000, sulfonation degree: 90%) with 139 g of water. After stirring the resultant mixture into a slurry, a white aqueous suspension (solid content: 40 wt. %, average particle size: 2.1 μm) was obtained in the same manner as in Example A-8.

EXAMPLE B-21

A white aqueous suspension having an average particle size of 2.0 μm (solid content: 45 wt. %) was obtained in the same manner as in Example B-7 except for the use of poly(sodium styrenesulfonate) (molecular weight: 3000, sulfonation degree: 60%).

COMPARATIVE EXAMPLE B-1

A brown aqueous suspension having an average particle size of 2.8 μm was obtained in the same manner as in Comparative Example A-1 except for the use of Resin (B)-1 instead of Resin (A)-1.

COMPARATIVE EXAMPLE B-2

Formation of an aqueous suspension was conducted in the same manner as in Comparative Example A-2 except for the use of Resin (B)-1 instead of Resin (A)-1. Considerable foaming took place upon processing the resultant mixture in the sand grinder. Even after the processing, it took 24 hours until foams disappeared. The work efficiency was hence extremely inferior. The thus-formed aqueous suspension was a viscous white aqueous suspension having an average particle size of 2.7 μm.

COMPARATIVE EXAMPLE B-3

A brown aqueous suspension (solid content: 47.8 wt. %, average particle size: 3.0 μm) was obtained in the same manner as in Comparative Example A-3 except for the use of Resin (B)-2 instead of Resin (A)-2.

Properties of the aqueous suspensions obtained separately in Examples B-1–B-21 and Comparative Examples B-1–B-3 were evaluated. Results are summarized in Table 2.

TABLE 2

| | | Ex. B-1 | Ex. B-2 | Ex. B-3 | Ex. B-4 | Ex. B-5 | Ex. B-6 | Ex. B-7 | Ex. B-8 |
|---|---|---|---|---|---|---|---|---|---|
| Properties of aqueous suspension | Hue reflectivity (%) | 82.5 | 82.6 | 82.5 | 82.5 | 83.0 | 83.1 | 83.2 | 82.5 |
| | Viscosity (cps) | 21.3 | 41.5 | 52.5 | 48.5 | 18.1 | 18.9 | 17.9 | 18.5 |
| | High-temperature storage stability: Filtration time (sec) | 30 | 55 | 45 | 63 | 29 | 26 | 18 | 30 |
| | High-temperature storage stability: Particle size change (μm) Before test | 2.5 | 2.4 | 3.4 | 2.7 | 2.3 | 2.5 | 2.0 | 2.6 |
| | High-temperature storage stability: Particle size change (μm) After test | 2.5 | 2.5 | 3.7 | 2.7 | 2.3 | 2.5 | 2.1 | 2.6 |
| Properties of aqueous coating formulation | Viscosity (cps) | 560 | 540 | 610 | 580 | 490 | 550 | 510 | 480 |
| | Amount of agglomerates formed* (%) | 0.01 | 0.02 | 0.02 | 0.03 | 0.01 | 0.02 | 0.005 | 0.02 |
| Properties as pressure-sensitive copying paper | Color producing ability: Color production rate (%) Initial ($J_1$) | 44.3 | 44.1 | 43.8 | 43.9 | 43.1 | 43.5 | 43.0 | 44.1 |
| | Color producing ability: Color production rate (%) Final ($J_2$) | 47.3 | 48.5 | 48.4 | 48.4 | 48.1 | 48.3 | 48.0 | 47.3 |
| | Whiteness of color developing sheet (F) | 82.1 | 82.1 | 82.1 | 82.2 | 82.0 | 82.0 | 82.0 | 82.1 |
| | Light yellowing resistance (ΔK) | 3.5 | 3.7 | 3.8 | 3.6 | 2.0 | 2.1 | 2.1 | 3.6 |
| | NOx yellowing resistance (ΔL) | 1.8 | 2.0 | 2.0 | 1.8 | 2.6 | 2.6 | 2.4 | 1.8 |

| | | Ex. B-9 | Ex. B-10 | Ex. B-11 | Ex. B-12 | Ex. B-13 | Ex. B-14 | Ex. B-15 | Ex. B-16 |
|---|---|---|---|---|---|---|---|---|---|
| Properties of aqueous suspension | Hue reflectivity (%) | 82.6 | 82.5 | 82.5 | 82.5 | 82.6 | 82.6 | 82.5 | 83.0 |
| | Viscosity (cps) | 20.3 | 16.5 | 17.5 | 17.4 | 24.0 | 15.5 | 14.8 | 17.1 |
| | High-temperature storage stability: Filtration time (sec) | 31 | 25 | 18 | 28 | 31 | 25 | 17 | 22 |
| | High-temperature storage stability: Particle size change (μm) Before test | 2.6 | 2.1 | 2.2 | 2.6 | 2.6 | 2.1 | 2.2 | 2.1 |
| | High-temperature storage stability: Particle size change (μm) After test | 2.6 | 2.2 | 2.2 | 2.6 | 2.6 | 2.2 | 2.2 | 2.2 |
| Properties of aqueous coating formulation | Viscosity (cps) | 470 | 470 | 480 | 490 | 530 | 480 | 510 | 490 |
| | Amount of agglomerates formed* (%) | 0.02 | 0.03 | 0.01 | 0.01 | 0.03 | 0.02 | 0.01 | 0.005 |
| Properties as pressure-sensitive copying paper | Color producing ability: Color production rate (%) Initial ($J_1$) | 43.9 | 44.4 | 44.2 | 44.4 | 44.0 | 44.2 | 44.4 | 43.0 |
| | Color producing ability: Color production rate (%) Final ($J_2$) | 47.4 | 46.9 | 47.2 | 47.1 | 47.3 | 46.9 | 47.2 | 48.3 |
| | Whiteness of color developing sheet (F) | 82.1 | 82.1 | 82.2 | 82.1 | 82.1 | 82.1 | 82.2 | 82.0 |
| | Light yellowing resistance (ΔK) | 3.7 | 3.8 | 3.5 | 3.6 | 3.7 | 3.9 | 3.4 | 2.1 |
| | NOx yellowing resistance (ΔL) | 2.0 | 2.0 | 1.9 | 1.9 | 2.0 | 1.9 | 2.0 | 2.5 |

| | | Ex. B-17 | Ex. B-18 | Ex. B-19 | Ex. B-20 | Ex. B-21 | Comp. Ex. B-1 | Comp. Ex. B-2 | Comp. Ex. B-3 |
|---|---|---|---|---|---|---|---|---|---|
| Properties of aqueous suspension | Hue reflectivity (%) | 83.0 | 83.1 | 83.0 | 83.0 | 83.2 | 76.1 | 82.4 | 60.3 |
| | Viscosity (cps) | 17.5 | 17.3 | 17.7 | 17.6 | 17.2 | 53.0 | 85.4 | 68.4 |
| | High-temperature storage stability: Filtration time (sec) | 21 | 23 | 20 | 25 | 23 | 180 | 40 | 480 |
| | High-temperature storage: Particle Before test | 2.1 | 2.3 | 2.1 | 2.1 | 2.0 | 2.8 | 2.7 | 3.0 |

TABLE 2-continued

| | | | | | | | | | | | |
|---|---|---|---|---|---|---|---|---|---|---|---|
| | stability | size change (μm) | After test | 2.3 | 2.3 | 2.1 | 2.1 | 2.1 | 4.5 | 3.0 | 5.1 |
| Properties of aqueous coating formulation | Viscosity (cps) | | | 495 | 500 | 497 | 505 | 510 | 590 | 760 | 610 |
| | Amount of agglomerates formed* (%) | | | 0.005 | 0.005 | 0.005 | 0.005 | 0.005 | 0.55 | 0.01 | 0.63 |
| Properties as pressure-sensitive copying paper | Color producing ability | Color production rate (%) | Initial ($J_1$) | 43.1 | 43.0 | 43.2 | 43.0 | 43.0 | 39.5 | 44.3 | 36.8 |
| | | | Final ($J_2$) | 48.3 | 48.5 | 48.3 | 48.1 | 48.1 | 43.3 | 46.8 | 43.1 |
| | Whiteness of color developing sheet (F) | | | 82.0 | 82.0 | 82.1 | 82.1 | 82.0 | 78.4 | 82.0 | 76.3 |
| | Light yellowing resistance (ΔK) | | | 2.1 | 2.1 | 2.1 | 2.1 | 2.1 | 10.8 | 3.6 | 8.4 |
| | NOx yellowing resistance (ΔL) | | | 2.7 | 2.7 | 2.7 | 2.5 | 2.4 | 9.4 | 1.8 | 14.5 |

*(measured by marron mechanical stability testing machine.)

EXAMPLE C-1

A white aqueous suspension having an average particle size of 2.5 μm (solid content: 40 wt. %) was obtained in the same manner as in Example A-1 except for the use of Resin (C)-1 in place of Resin (A)-1.

EXAMPLE C-2

A white aqueous suspension (solid content: 45 wt. %, average particle size: 2.1 μm) was obtained in the same manner as in Example A-2 except for the use of Resin (C)-2 in place of Resin (A)-2.

EXAMPLE C-3

A white aqueous suspension having a solid content of 50 wt. % (average particle size: 2.1 μm) was obtained in the same manner as in Example A-3 except for the use of Resin (C)-3 in place of Resin (A)-3.

EXAMPLE C-4

A white aqueous suspension (solid content: 40 wt. %, average particle size: 2.2 μm) was obtained in the same manner as in Example B-11 except for the use of Resin (C)-4 in place of Resin (B)-1.

EXAMPLE C-5

A white aqueous suspension (solid content: 40 wt. %, average particle size: 2.3 μm) was obtained in the same manner as in Example A-5 except for the use of Resin (C)-1 in place of Resin (A)-1.

EXAMPLE C-6

A white aqueous suspension (solid content: 45 wt. %, average particle size: 1.9 μm) was obtained in the same manner as in Example A-6 except for the use of Resin (C)-2 in place of Resin (B)-2.

EXAMPLE C-7

A white aqueous suspension having an average particle size of 2.4 μm (solid content: 48 wt. %) was obtained in the same manner as in Example A-7 except for the use of Resin (C)-3 in place of Resin (A)-3.

COMPARATIVE EXAMPLE C-1

A brown aqueous suspension having an average particle size of 2.8 μm was obtained by following the procedure of Comparative Example A-1 except for the use of Resin (C)-1 in place of Resin (A)-1.

COMPARATIVE EXAMPLE C-2

Formation of an aqueous suspension was conducted in the same manner as in Comparative Example A-2 except for the use of Resin (C)-1 instead of Resin (A)-1. Considerable foaming took place upon conducting the stirring and slurry formation prior to the processing in the sand grinder and during the processing in the sand grinder. Even after the processing, it took 24 hours until foams disappeared. The work efficiency was hence extremely inferior. The thus-formed aqueous suspension was a viscous white aqueous suspension having an average particle size of 2.7 μm.

COMPARATIVE EXAMPLE C-3

A brown aqueous suspension (solid content: 47.8 wt. %, average particle size: 3.0 μm) was obtained in the same manner as in Comparative Example A-3 except for the use of Resin (C)-2 instead of Resin (A)-2.

Properties of the aqueous suspensions obtained separately in Examples C-1–C-7 and Comparative Examples C-1–C-3 were evaluated. Results are summarized together with evaluation results of the suspension of Comparative Example A-8 in Table 3.

TABLE 3

| | | | | Ex. C-1 | Ex. C-2 | Ex. C-3 | Ex. C-4 | Ex. C-5 | Ex. C-6 | Ex. C-7 | Comp. Ex. A-8 |
|---|---|---|---|---|---|---|---|---|---|---|---|
| Properties of aqueous suspension | Hue reflectivity (%) | | | 83.2 | 82.8 | 82.7 | 82.7 | 83.1 | 82.7 | 82.7 | 80.7 |
| | Viscosity (cps) | | | 16.3 | 18.5 | 20.1 | 18.5 | 17.5 | 19.1 | 15.0 | 24.0 |
| | High-temperature storage stability | Filtration time (sec) | | 31 | 30 | 27 | 18 | 32 | 35 | 16 | 52 |
| | | Particle size change (μm) | Before test | 2.5 | 2.1 | 2.1 | 2.2 | 2.3 | 1.9 | 2.4 | 2.5 |
| | | | After test | 2.5 | 2.1 | 2.2 | 2.2 | 2.4 | 2.0 | 2.4 | 2.7 |
| Properties of aqueous coating | Viscosity (cps) | | | 470 | 480 | 470 | 480 | 470 | 460 | 480 | 490 |
| | Amount of agglomerates formed* (%) | | | 0.01 | 0.01 | 0.02 | 0.005 | 0.03 | 0.03 | 0.005 | 0.02 |

TABLE 3-continued

| | | | | | | | | | | | |
|---|---|---|---|---|---|---|---|---|---|---|---|
| formulation | | | | | | | | | | | |
| Properties as pressure-sensitive copying paper | Color producing ability | Color production rate (%) | Initial ($J_1$) | 43.8 | 44.4 | 42.8 | 43.1 | 44.1 | 43.8 | 44.1 | 39.4 |
| | | | Final ($J_2$) | 47.4 | 47.4 | 48.0 | 47.5 | 47.5 | 47.5 | 48.0 | 44.8 |
| | Whiteness of color developing sheet (F) | | | 82.0 | 82.0 | 82.0 | 82.1 | 82.0 | 82.0 | 82.0 | 81.9 |
| | Light yellowing resistance (ΔK) | | | 3.6 | 3.7 | 3.7 | 3.8 | 3.6 | 3.7 | 3.8 | 16.5 |
| | NOx yellowing resistance (ΔL) | | | 2.0 | 2.1 | 2.1 | 2.0 | 1.9 | 2.0 | 2.0 | 36.2 |

| | | | | Comp. Ex. C-1 | Comp. Ex. C-2 | Comp. Ex. C-3 |
|---|---|---|---|---|---|---|
| Properties of aqueous suspension | Hue reflectivity (%) | | | 76.1 | 82.4 | 60.1 |
| | Viscosity (cps) | | | 76.0 | 124.0 | 69.0 |
| | High-temperature storage stability | Filtration time (sec) | | 210 | 85 | 485 |
| | | Particle size change (μm) | Before test | 2.7 | 2.7 | 3.0 |
| | | | After test | 6.4 | 2.7 | 4.5 |
| Properties of aqueous coating formulation | Viscosity (cps) | | | 590 | (viscous) 1640 | 720 |
| | Amount of agglomerates formed* (%) | | | 1.80 | 0.09 | 0.48 |
| Properties as pressure-sensitive copying paper | Color producing ability | Color production rate (%) | Initial ($J_1$) | 39.8 | 44.0 | 36.8 |
| | | | Final ($J_2$) | 46.0 | 47.0 | 43.4 |
| | Whiteness of color developing sheet (F) | | | 78.1 | 82.0 | 76.3 |
| | Light yellowing resistance (ΔK) | | | 11.8 | 3.9 | 8.6 |
| | NOx yellowing resistance (ΔL) | | | 10.8 | 2.1 | 18.4 |

*(measured by marron mechanical stability testing machine.)

As is apparent from the foregoing, it has become feasible to prepare an aqueous suspension of a multivalent-metal-modified salicylic acid resin, said suspension having the below-described advantages, by using the above-described aionic water-soluble high-molecular compound as a dispersant upon preparation of the aqueous suspension.

(1) The suspension is colored very little and has a high degree of whiteness.

(2) The suspension is dispersed in an extremely stable state and develops little coagulation or sedimentation even when stored for a long period of time at high temperatures.

(3) Stable aqueous suspensions can be obtained over a wide pH range. They are less affected by an acid, alkali, salt and/or the like, which are contained in the multivalent-metal-modified salicylic acid.

(4) Thickening and/or foaming occur very little during the formation of the aqueous suspension.

(5) The aqueous coating formulation, which has been obtained by mixing the suspension with other components of the aqueous coating formulation and is suitable for use in the production of pressure-sensitive copying papers, is excellent in both thermal and mechanical stability.

(6) Upon preparation of the aqueous coating formulation and during coating work, foaming takes place very little so that the efficiency of the coating work is superb.

(7) The aqueous suspension provides excellent pressure-sensitive copying papers free of the problem that the dispersant itself would be yellowed and deteriorated upon exposure to light or during storage and would hence be deteriorated in quality.

We claim:

1. An aqueous suspension of a multivalent-metal-modified salicyclic acid resin, characterized in that the multivalent-metal-modified salicyclic acid resin is selected from the group consisting of:

(A) first multivalent-metal-modified products of a salicyclic acid resin comprising structural units represented by the following (I) and (II):

Formula (I):

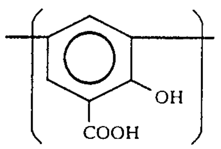

Formula (II): at least one of

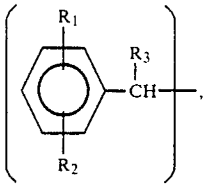
,
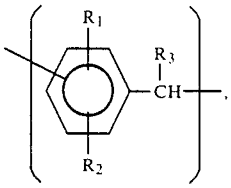
,

-continued

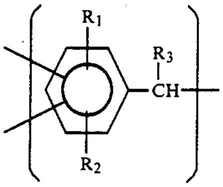 and 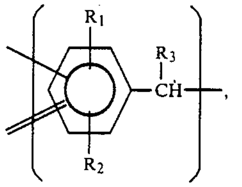, wherein $R_1$ and $R_2$ are independently a hydrogen atom or a $C_{1-12}$ alkyl, aralkyl, aryl or cycloalkyl group and $R_3$ denotes a hydrogen atom or a $C_{1-4}$ alkyl group, said structural units (I) and (II) accounting for 5 to 40 mole percent and 60 to 95 mole percent, respectively, each of said structural units (I) being coupled with one of said structural units (II) via the substituted methylene structure attached to the phenyl ring of said one of said structural units (II), one or more of said structural units (II) being coupled via the substituted methylene structure(s) attached to the phenyl rings(s) thereof with the structural units(s) (I) or the structural unit(s) (I) and the benzene ring or rings of another or other structural units (II), and said salicyclic acid resin having a weight average molecular weight of 500 to 10,000, (B) second multivalent-metal-modified products of another salicyclic acid resin comprising structural units represented by the following formulae (I), (II) and (III):

Formula (I):

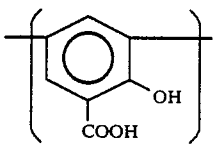

Formula (II): at least one of

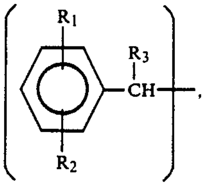, 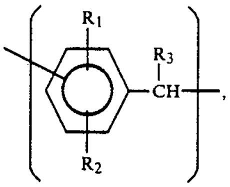,

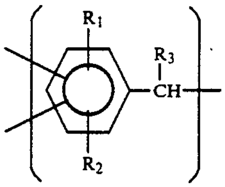 and 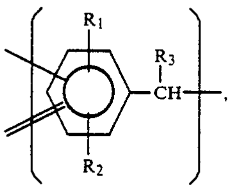,

Formula (III): at least one of

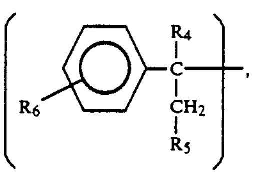, 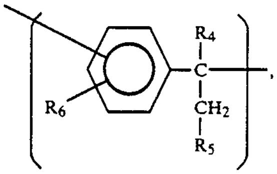, and

-continued

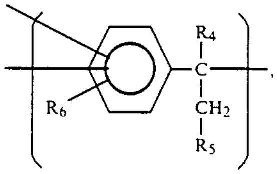, wherein $R_1$ and $R_2$ are independently a hydrogen atom or a $C_{1-12}$ alkyl, aralkyl, aryl or cycloalkyl group, $R_3$ and $R_6$ denote independently a hydrogen atom or a $C_{1-4}$ alkyl group and $R_4$ and $R_5$ are individually a hydrogen atom or a methyl group, said structural units (I), (II) and (III) accounting for 5 to 35 mole percent, 10 to 85 mole percent and 4 to 85 mole percent, respectively, each of said structural units (I) being coupled with one of said structural units (II) via the substituted methylene structure attached to the phenyl ring of said one of said structural units (II), one or more of said structural units (II) being coupled via the substituted methylene structure(s) attached to the phenyl ring(s) thereof with the structural unit(s) (I) or the structural units(s) (I) and the benzene ring or rings of another or other structural units (II), each of said structural units (III) being coupled via the substituted methylene structure attached to the phenyl ring thereof with the benzene ring of one of the structural units (II) and/or (III), and said another salicyclic acid resin having a weight average molecular weight of 500 to 10,000, and (C) third multivalent-metal-modified products of a further salicyclic acid resin comprising structural units represented by the following formulae (IV) and (V):

Formula (IV): at least one of

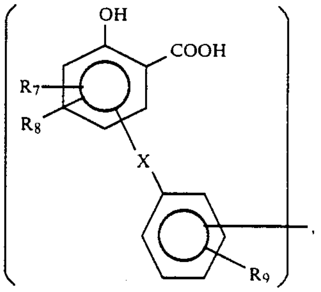,

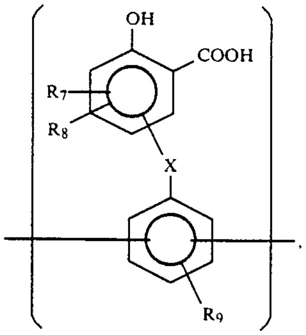.

-continued
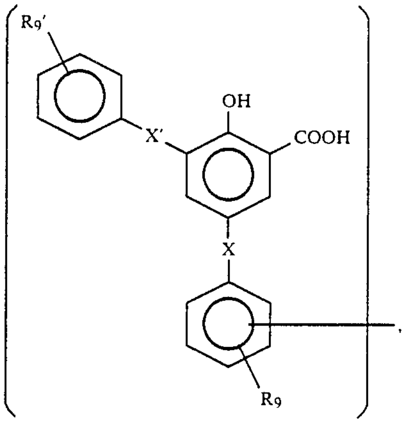
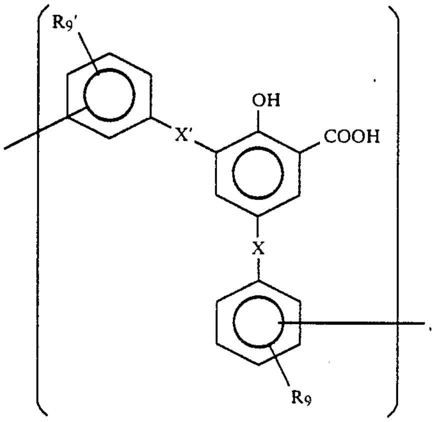
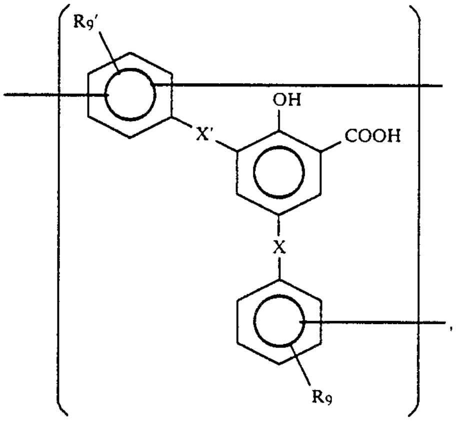
-continued
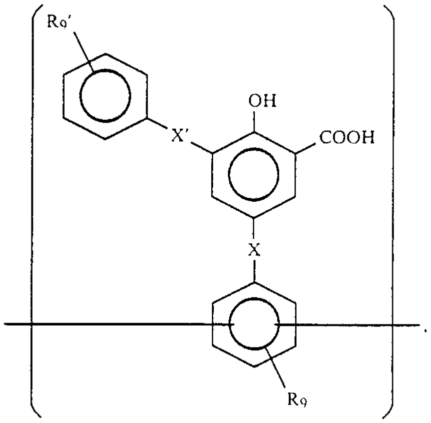
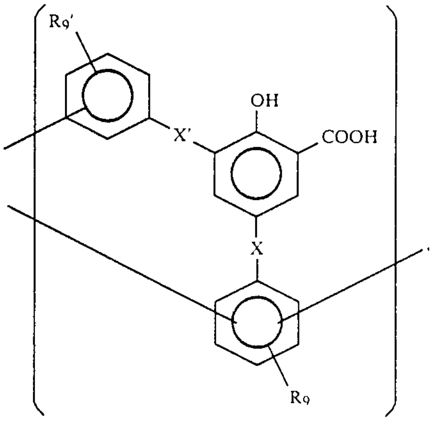
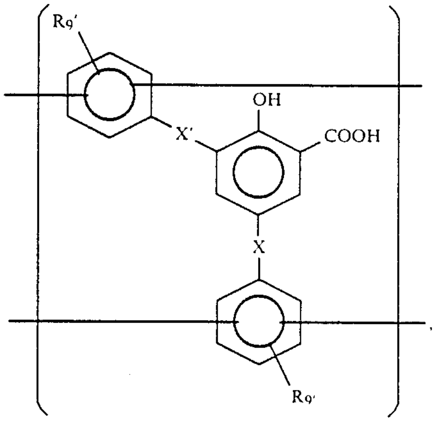

-continued

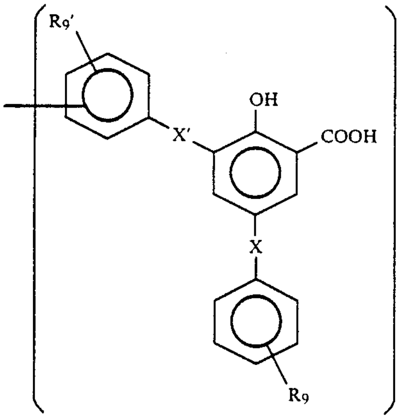

and

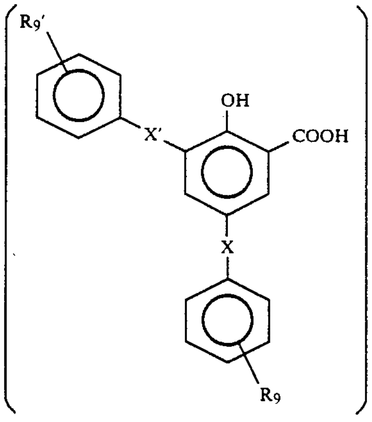

Formula (V): at least one of

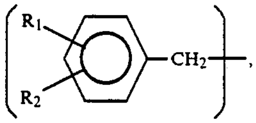

,

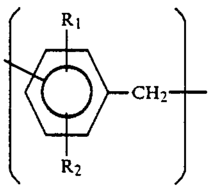

and

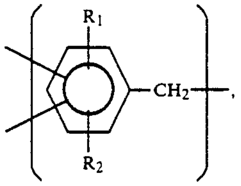

, wherein $R_1$, $R_2$, $R_7$, $R_8$, $R_9$ and $R_9'$ are independently a hydrogen atom or a $C_{1-12}$ alkyl, aralkyl, aryl or cycloalkyl group, $R_7$ and $R_8$ may optionally be bonded to adjacent carbons of the corresponding benzene ring and form a ring together with the adjacent carbons, and x and x′ denote independently a direct bond or a straight-chain or branched divalent $C_{1-5}$ hydrocarbon group, said structural units (IV) and (V) accounting for 10 to 70 mole percent and 30 to 90 mole percent, respectively, each of said structural units (V) being coupled with one of said structural units (IV) and/or (V) via the substituted methylene structure attached to the phenyl ring of said one of said structural units (V), and said further salicyclic acid resin having a weight average molecular weight of 500 to 10,000; and the multivalent-metal-modified salicyclic acid resin is dispersed as fine particles having an average particle size of 0.5 to 10 μm in an aqueous solution of a dispersant, whose pH value is adjusted to 4 to 10, composed of at least one compound selected from the group consisting of:

(a) water-soluble anionic compounds composed of polyvinyl alcohol substituting at least one OH radical with a sulfonic acid group, copolymer of polyvinyl alcohol with at least one monomer containing a sulfonic acid group in its molecules, or polyvinyl alcohol converting at least one OH radical to sulfoacetal, each compound having a polyvinyl alcohol structure whose average degree of polymerization ranges from 200 to 300 and containing a sulfonic acid group, (b) acrylamide-copolymerized polyvinyl alcohols having an average polymerization degree of 200 to 2,000 and an acrylamide content of 2 to 30 mole percent, and (c) water-soluble anionic compounds composed of polymers or copolymers comprising as their essential components styrensulfonic acid derivatives represented by the following general formula (VI):

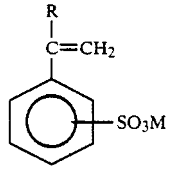

(VI)

the polystyrenesulfonic acid derivatives being represented by the general formula (VII):

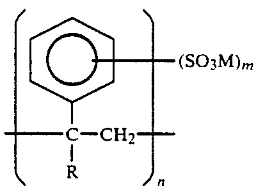

(VII)

wherein R is a hydrogen atom or a $C_{1-5}$ alkyl group, M denotes $Na^+$, $K^+$, $Cs^+$, $Fr^+$ or $NH_4^+$, n stands for an integer of 5 to 10,000, m is an integer ranging from 1 to 10,000 but not exceeding n, and one or more of the Rs in each molecule may be different from the rest of the Rs.

2. The aqueous suspension as claimed in claim 1 wherein the concentration of the multivalent-metal-modified salicyclic acid resin in the aqueous suspension is 10 to 70 weight percent.

3. The aqueous suspension as claimed in claim 1 wherein the concentration of the multivalent-metal-modified salicylic acid resin in the aqueous suspension is 30 to 60 weight percent.

4. The aqueous suspension as claimed in claim 1 wherein the dispersant is contained in an amount of 0.3 to 30 parts by weight per 100 parts by weight of the multivalent-metal-modified salicyclic acid resin.

5. The aqueous suspension as claimed in claim 1 wherein the dispersant is contained in an amount of 2 to 20 parts by weight per 100 parts by weight of the multivalent-metal-modified salicyclic acid resin.

6. The aqueous suspension as claimed in claim 1 wherein the salts of the water-soluble anionic compounds are alkali metal and ammonium salts.

7. The aqueous suspension as claimed in claim 1 wherein the compounds (c) are salts of polystyrenesulfonic acids obtained by sulfonating polystyrene.

8. The aqueous suspension as claimed in claim 1 wherein the compounds (c) are salts of copolymers of styrenesulfonic acid and maleic acid.

9. The aqueous suspension as claimed in claim 1 wherein the compounds (c) are salts of sulfonated derivatives of styrene-maleic acid copolymers.

10. A method for the preparation of the aqueous suspension as claimed in claim 1, wherein the multivalent-metal-modified salicylic acid resin selected from the group consisting of the products (A), (B) and (C) is finely ground in the aqueous solution of the dispersant, whose pH value is adjusted to 4 to 10, composed of at least one compound selected from the group consisting of the compounds (a) and (c) and the acrylamide-copolymerized polyvinyl alcohols (b).

11. The method as claimed in claim 10 wherein the pH value of the aqueous solution of the dispersant is adjusted to 6 to 9.

* * * * *